US009608817B2

(12) United States Patent
Gentry et al.

(10) Patent No.: US 9,608,817 B2
(45) Date of Patent: Mar. 28, 2017

(54) HOMOMORPHIC EVALUATION INCLUDING KEY SWITCHING, MODULUS SWITCHING, AND DYNAMIC NOISE MANAGEMENT

(71) Applicants: International Business Machines Corporation, Armonk, NY (US); University of Bristol, Bristol (GB)

(72) Inventors: Craig B. Gentry, New York, NY (US); Shai Halevi, Elmsford, NY (US); Nigel P. Smart, Bristol (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/008,921

(22) Filed: Jan. 28, 2016

(65) Prior Publication Data

US 2016/0164670 A1 Jun. 9, 2016

Related U.S. Application Data

(62) Division of application No. 13/746,713, filed on Jan. 22, 2013, now Pat. No. 9,281,941.

(Continued)

(51) Int. Cl.
*G06F 21/00* (2013.01)
*H04L 9/16* (2006.01)
(Continued)

(52) U.S. Cl.
CPC ............... *H04L 9/16* (2013.01); *H04L 9/008* (2013.01); *H04L 9/0618* (2013.01); *H04L 9/08* (2013.01);
(Continued)

(58) Field of Classification Search
USPC ........................................................ 380/28
See application file for complete search history.

(56) References Cited

U.S. PATENT DOCUMENTS 4,405,829 A    9/1983  Rivest et al. ............... 380/30
5,495,488 A    2/1996  Nakamura
(Continued)

FOREIGN PATENT DOCUMENTS

| CN | 101645777 | 2/2010 |
|---|---|---|
| JP | 62132451 | 6/1987 |
| JP | 2009186950 | 8/2009 |

OTHER PUBLICATIONS

Feller, W. "An Introduction to Probability Theory and its Applications", vol. 1, 3rd Edition, 1968, whole document (525 pages), John Wiley & Sons, Inc.
(Continued)

*Primary Examiner* — Harris C Wang
(74) *Attorney, Agent, or Firm* — Harrington & Smith

(57) ABSTRACT

Homomorphic evaluation of a function is performed on input ciphertext(s), which were encrypted using a public key of an encryption scheme that also includes multiple secret keys. Each input ciphertext includes multiple real numbers that are kept with finite precision. Performing the homomorphic evaluation of the function includes performing operation(s). Performing each of one or more operations includes the following. A key-switching transformation is performed on selected ciphertext(s), including converting a first version of a selected ciphertext with respect to a first of the secret keys and with some number r bits of precision to a second version of the selected ciphertext with respect to a second of the secret keys and with some other number r' bits of precision, r'>r. Each key switching transformation is performed prior to or after the operation(s) are evaluated. Results of the operation(s) are output.

20 Claims, 8 Drawing Sheets

Related U.S. Application Data

(60) Provisional application No. 61/600,265, filed on Feb. 17, 2012.

(51) Int. Cl.
*H04L 9/08* (2006.01)
*H04L 9/00* (2006.01)
*H04L 9/06* (2006.01)
*H04L 9/30* (2006.01)

(52) U.S. Cl.
CPC ............ *H04L 9/30* (2013.01); *H04L 2209/24* (2013.01); *H04L 2209/34* (2013.01)

(56) References Cited

U.S. PATENT DOCUMENTS

| | | | |
|---|---|---|---|
| 6,530,020 B1 | 3/2003 | Aoki | |
| 7,054,444 B1 | 5/2006 | Paillier | 380/30 |
| 7,068,787 B1 | 6/2006 | Ta et al. | |
| 7,089,276 B2 | 8/2006 | Miller et al. | |
| 7,260,552 B2 | 8/2007 | Riera Jorba et al. | |
| 7,500,111 B2 | 3/2009 | Hacigumus et al. | 713/193 |
| 7,577,250 B2* | 8/2009 | Damgaard | H04L 9/0861 380/277 |
| 7,640,432 B2 | 12/2009 | Gennaro et al. | |
| 7,856,100 B2 | 12/2010 | Wang et al. | |
| 7,869,598 B2 | 1/2011 | Kerschbaum | |
| 7,877,410 B2 | 1/2011 | Staddom et al. | |
| 8,249,250 B2 | 8/2012 | Rane et al. | |
| 8,311,213 B2 | 11/2012 | Rane et al. | |
| 8,515,058 B1* | 8/2013 | Gentry | H04L 9/008 380/28 |
| 8,627,107 B1 | 1/2014 | Kennedy et al. | |
| 2002/0041682 A1 | 4/2002 | Lambert | |
| 2002/0103999 A1 | 8/2002 | Camnisch et al. | |
| 2002/0164035 A1 | 11/2002 | Yokota et al. | |
| 2003/0056118 A1 | 3/2003 | Troyansky et al. | |
| 2003/0172262 A1 | 9/2003 | Curry | |
| 2005/0120233 A1 | 6/2005 | Halcrow et al. | |
| 2005/0193048 A1 | 9/2005 | Vaudenay et al. | 708/400 |
| 2006/0015946 A1 | 1/2006 | Yagawa | |
| 2006/0262933 A1 | 11/2006 | Furukawa | |
| 2007/0005594 A1 | 1/2007 | Pinkas et al. | |
| 2007/0116283 A1 | 5/2007 | Tuyls et al. | |
| 2007/0118746 A1 | 5/2007 | Lauter et al. | |
| 2007/0140479 A1* | 6/2007 | Wang | H04L 9/008 380/30 |
| 2007/0156586 A1* | 7/2007 | Kerschbaum | H04L 9/30 705/50 |
| 2007/0192864 A1 | 8/2007 | Bryant et al. | |
| 2008/0010467 A1 | 1/2008 | Kerschbaum et al. | |
| 2008/0059787 A1 | 3/2008 | Hohenberger et al. | |
| 2008/0212780 A1 | 9/2008 | Lemma et al. | |
| 2008/0226066 A1 | 9/2008 | Yi et al. | |
| 2008/0294909 A1 | 11/2008 | Ostrovsky et al. | 713/189 |
| 2008/0304657 A1 | 12/2008 | Tuyls et al. | |
| 2009/0006855 A1* | 1/2009 | Tuyls | H04L 9/3218 713/182 |
| 2009/0062942 A1 | 3/2009 | Smaragdis et al. | 700/94 |
| 2009/0103721 A1 | 4/2009 | Sada et al. | 380/42 |
| 2009/0138459 A1 | 5/2009 | Walter et al. | |
| 2009/0268908 A1 | 10/2009 | Bikel et al. | 380/255 |
| 2009/0327748 A1 | 12/2009 | Agrawal et al. | 713/189 |
| 2010/0329448 A1 | 12/2010 | Rane et al. | |
| 2011/0099385 A1 | 4/2011 | Takahashi | |
| 2011/0110525 A1* | 5/2011 | Gentry | H04L 9/0822 380/285 |
| 2011/0283099 A1* | 11/2011 | Nath | H04L 9/008 713/150 |
| 2012/0039473 A1 | 2/2012 | Gentry et al. | |
| 2012/0066510 A1 | 3/2012 | Weinman | |
| 2012/0151205 A1 | 6/2012 | Raykova et al. | |
| 2013/0170640 A1* | 7/2013 | Gentry | H04L 9/28 380/30 |
| 2013/0216044 A1* | 8/2013 | Gentry | H04L 9/008 380/277 |
| 2014/0177828 A1* | 6/2014 | Loftus | H04L 9/008 380/44 |
| 2015/0033018 A1 | 1/2015 | Tateishi | |
| 2015/0172258 A1 | 6/2015 | Komano | |

OTHER PUBLICATIONS

Gama, Nicolas, et al., "Predicting Lattice Reduction", In Advances in Cryptology—EUROCRYPT '08, vol. 4965 of Lecture Notes in Computer Science, pp. 31-51, 2008.
Gentry, Craig, "Toward Basing Fully Homomorphic Encryption on Worst-Case Hardness", In Advances in Cryptology—CRYPTO '10, vol. 6223 of Lecture Notes in Computer Science, 22 pgs., 2010.
Goldreich, Oded, et al., "Public-Key Cryptosystems from Lattice Reduction Problems", In Advances in Cryptology—CRYPTO '97, vol. 1294 of Lecture notes in Computer Science, pp. 112-131, 1997.
Lyubashevsky, Vadim, et al., On Ideal Lattices and Learning with Errors Over Rings. In Advances in Cryptology—EUROCRYPT '10, vol. 6110 of Lecture Notes in Computer Science, pp. 1-23, 2010.
Micciancio, Daniels, "Improving Lattice Based Cryptosystems Using the Hermite Normal Form", In CaLC '01, vol. 2146 of Lecture Notes in Computer Science, pp. 126-145, 2001.
Peikert, Christ et al., "Lattices that Admit Logarithmic Worst-Case to Average-Case Connection Factors", In Proceedings of the 39th Annual ACM Symposium on Theory of Computing STOC'07, pp. 478-487, Apr. 4, 2007.
Schnorr, C.P., "A Hierarchy of Polynomial Time Lattice Basis Reduction Algorithms", Theor. Comput. Sci., 53.201, pp. 201-224, 1987.
Schoup, NTL: A Library for doing Number Theory, http://shoup.net/ntl/; Version 5.5.2, Nov. 2010.
Smart, Nigel P., et al., "Fully Homomorphic Encryption with Relatively Small Key and Ciphertext Sizes", In Public Key Crypotography—PKC'10, vol. 6056 of Lecture Notes in, Computer Science, pp. 420-443, 2010.
Stehle, Damien, et al., "Faster Fully Homomorphic Encryption", Cryptology ePrint Archive, Report 2010/399, http://eprint.iacr.org/; 25 pp. 2010.
Applebaum, Benny, et al., "Fast Cryptographic Primitives and Circular-Secure Encryption Based on Hard Learning Problems", CRYTPO, vol. 5677 of Lecture Notes in Computer Science, pp. 595-618, 2009.
Brakerski, Zvika,et al., Efficient Fully Homomorphic Encryption from (Standard) LWE, FOCS, http://eprint.iacr.org/; 37 pp. 2011.
Brakerski, Zvika, et al., "Fully Homomorphic Encryption from Ring—LWE and Security for Key Dependent Messages", CRYPTO, 2011, 20 pgs.
Coron, Jean-Sebastien, et al., "Fully Homomorphic Encryption over the Integers with Shorter Public Keys", CRYPTO, 2011, 24 pgs.
Gentry, Craig et al., "Fully Homomorphic Enryption without Squashing Using Depth-3 Arithmetic Circuits", FOCS, http://eprint.iacr.org/; 2011, 21 pgs.
Gentry, Craig, et al., "Implementing Gentry's Fully-Homomorphic Encryption Scheme", EYROCRYPT, vol. 0632, Lecture notes in Computer Science, 2011, pp. 129-148.
Gentry, Craig, et al., "Fully Homomorphic Encryption with Polylog Overhead", http://eprint.iacr.org/; 2011, 32 pgs.
Lauter, Kristin, et al., "Can Homomorphic Encryption be Practical?", ACM, 2011, 11 pgs.
Melchor, Carlos Aguilar, et al., "Additively Homomorphic Enryption with d-Operand Multiplications", CRYPTOm vik, 6223, Lecture Notes in Computer Science, 2010, pp. 138-154.
Regev, Oded, "The Learning with Errors Problem", IEEE, 2010, pp. 191-204.
Smart, N.P. et al., "Fully Homomorphic SIMD Operations", http://eprint.iacr.org/; 2011, 19 pgs.
Stehle, Damien, et al., "Faster Fully Homomorphic Encryption", ASIACRYPT, vol. 6477, Lecture Notes in Computer Science, 2010, pp. 377-394.

(56) References Cited

OTHER PUBLICATIONS

Chunsheng, Gu, "New fully Homomorphic Encryption over the Integers", School of Computer Engineering, Jiangsu Teachers Univ. of Technology, Mar. 2011, 9 pgs.

Dodis, Yevgeniy, et al., "Cryptography Against Continuous Memory Attacks", IEEE 2010, pp. 511-520.

Avanzi, Roberto M., "Fast Evaluation of Polynomials With Small Coefficients Modulo an Integer", http://caccioppoli.mac.rub.de/website/papers/trick.pdf; 2005, 5 pgs.

Gentry, Craig, et al., "Public Challenges for Fully-Homomorphic Encryption", TBA, 2010, 2 pgs.

Micciancio, Daniele, "Generalized Compact Knapsacks, Cyclic Lattices, and Efficient One-Way Functions", Computational Complexity 16(4), Dec. 2007, pp. 365-411.

Paterson, Michael S., et al., "On the Number of Nonscalar Multiplications Necessary to Evaluate Polynomials", SIAM Journal on Computing, 2(1), pp. 60-66, 1973.

Granlund, Torbjorn, et al., "The GNU MP Multiple Precision Arithmetic Library", Version 5.0.1, Feb. 2010, 144 pgs.

Dijk et al., http://csis.bits-pilani.ac.in/faculty/murali/netsec-11/seminadrefs/jaldeepl.pdf; , [online] published Jun. 2010 [retrieved on Jul. 2, 2012] Retrieved from the Internet URL: http://csis.bits-pilani.acin/faculty/murali/netsec-11/seminar/refs/jaldeep1.pdf; entire document.

U.S. Appl. No. 13/205,755, Craig B. Gentry, et al., "Fast Evaluation of Many Polynomials With Sniall Coefficients on the Same Point", filed Aug. 9, 2011, 104 pgs.

U.S. Appl. No. 13/205,795, Craig B. Gentry, et al., "Fast Computation of a Single Coefficient in an Inverse Polynomial", filed Aug. 9, 2011, 104 pgs.

U.S. Appl. No. 13/205,813, Craig B. Gentry, et al., "Efficient Implementation of Fully Homomorphic Encryption", filed Aug. 9, 2011, 108 pgs.

U.S. Appl. No. 13/458,518, Craig B. Gentry, "Fully Homomorphic Encryption", filed Apr. 27, 2012, 90 pgs.

C.A. Melchor, G. Castagnos, and P. Gaborit. Lattice-based homomorphic encryption of vector spaces. In *IEEE International Symposium on Information Theory, ISIT* 2008, pp. 1858-1862, 2008.

C.A. Melchor, P. Gaborit, and J. Herranz. Additively Homomorphic Encryption with *d*-Operand Multiplications. Technical Report 2008/378, IACR ePrint archive, 2008. Available at http://eprint.iacr.org/2008/378/.

M. Ajtai. Generating Hard Instances of the Short Basis Problem. *ICALP*'99, LNCS 1644, pp. 1-9, 1999.

J. Alwen and C. Peikert. Generating Shorter Bases for Hard Random Lattices. In *STACS*, pp. 75-86, 2009.

D. Boneh, E.-J. Goh, and K. Nissim. Evaluating 2-DNF Formulas on Ciphertexts. (TCC '05, LNCS 3378, pp. 325-341, 2005), 2006.

Y. Dodis, S. Goldwasser, Y. Kalai, C. Peikert, and V. Vaikuntanathan. Public-Key Encryption Schemes with Auxiliary Inputs. In *TCC*, pp. 361-381, 2010.

C. Gentry. *A Fully Homomorphic Encryption Scheme*. Dissertation, Stanford University, 2009. Available at http://crypto.stanford.edu/craig.

C. Gentry. Fully Homomorphic Encryption Using Ideal Lattices. In *Proc. of STOC* '09, pp. 169-178. ACM, 2009.

C. Gentry, C. Peikert, and V. Vaikuntanathan. Trapdoors for Hard Lattices and New Cryptographic Constructions, (In *STOC*, pp. 197-206, 2008), 2007.

A. Kawachi, K. Tanaka, and K. Xagawa. Multi-bit Cryptosystems Based on Lattice Problems. In *Public Key Cryptography* (*PKC*'07), LNCS 4450, pp. 315-329. Springer, 2007.

Y. Lindell and B. Pinkas. A Proof of Yao's Protocol for Secure Two-Party Computation. (*J. Cryptology*, 22(2), 2009), 2004.

C. Peikert. Public-Key Cryptosystems from the Worst-Case Shortest Vector Problem. In *STOC*'09, pp. 333-342. ACM, 2009.

O. Regev. On Lattices, Learning with Errors, Random Linear Codes, and Cryptography. *J. ACM*, 56(6), 2009. Preliminary version in *Proc. of STOC* '05, pp. 84-93, 2005.

A. C. Yao. Protocols for Secure Computations (extended abstract). In *23rd Annual Symposium on Foundations of Computer Science—FOCS* '82, pp. 160-164. IEEE, 1982.

J. Domingo-Ferrer. "A Provably Secure Additive and Multiplicative Privacy Homomorphism." Information Security. 5th International Conference, ISC 2002 Proceedings, pp. 471-483, 2002.

K. Henry. The Theory and Applications of Homomorphic Cryptography. Dissertation, University of Waterloo, 2008.

J. Black, P. Rogaway, T. Shrimpton. Encryption-Scheme Security in the Presence of Key-Dependent Messages. In Proc. of SAC '02, LNCS 2595. Springer, pp. 62-75, 2002.

M. Blaze, G. Bleumer, M. Strauss. Divertible Protocols and Atomic Proxy Cryptography. Eurocrypt '98. LNCS 1403, pp. 127-144,1998.

D. Boneh, S. Halevi, M. Hamburg, R. Ostrovsky. Circular-Secure Encryption from Decision Diffe-Hellman. In Proc. of Crypto.'08, LNCS 5157, pp. 108-125, 2008.

R. Canetti, O. Goldreich, S. Halevi. The Random Oracle Methodology, Revisited. (Extended abstract in *Proc. of the 30th ACM Symp. on Theory of Computing* (*STOC*), pp. 209-218, 1998), 2002.

M. Naor, K. Nissim. Communication Preserving Protocols for Secure Function Evaluation. In Proc. of STOC '01, pp. 590-599, 2001.

R. Ostrovsky, W.E. Skeith III. Private Searching on Streaming Data. (Preliminary Version in Proc. of Crypto '05. LNCS 3621, pp. 223-240, 2005.) *J. Cryptology*, vol. 20:4, pp. 397-430, Nov. 2006, Oct. 2007 (two versions provided).

IBM Researcher Solves Longstanding Cryptographic Challenge. IBM Press Release (available online), Jun. 25, 2009.

Homomorphic Encryption. IBM Research, Security (available online), Accessed Sep. 28, 2009.

Homomorphic encryption. Wikipedia, accessed Sep. 30, 2009.

U.S. Appl. No. 12/749,944, Halevi et al., "An Efficient Homomorphic Encryption Scheme for Bilinear Forms", filed Mar. 30, 2010, 61 pgs.

U.S. Appl. No. 12/590,584, Craig B. Gentry , "A Fully Homomorphic Encryption Method Based on a Bootstrappable Encryption Scheme, Computer Program and Apparatus", filed Nov. 10, 2009, 80 pgs.

R. Cramer, I. Damgaard, J.B. Nielsen. Multiparty Computation from Threshold Homomorphic Encryption. In Proc. of Crypto '01, LNCS 2045, pp. 279-298, 2001.

M. Franklin, S. Haber. Joint Encryption and Message-Efficient Secure Computation. J. Cryptology, 9(4), pp. 217-232, 1996.

O. Goldreich, S. Micali, A. Wigderson. How to Play Any Mental Game—A Completeness Theorem for Protocols with Honest Majority. J. of the ACM, vol. 38, No. 1, pp. 691-729, 1991. Preliminary Version in FOCS '86.

O. Goldreich, R. Ostrovsky. Software Protection and Simulation on Oblivious RAMs. JACM, 1996.

S. Goldwasser, Y.T. Kalai, G.N. Rothblum. One-Time Programs. In Proc. of Crypto '08. Springer, LNCS 5157, pp. 39-56, 2008.

S. Halevi, H. Krawczyk. Security Under Key-Dependent Inputs. In Proc. of ACM CCS '07, 2007.

F. Armknecht and A.-R. Sadeghi. A New Approach for Algebraically Homomorphic Encryption. Cryptology ePrint Archive: Report 2008/422, 2008.

S. Arora, C. Lund, R Motwani, M. Sudan, and M. Szegedy. Proof Verification and the Hardness of Approximation Problems. J. of the ACM, vol. 45, No. 3, pp. 501-555, 1998.

D. Barrington. Bounded-Width Polynomial-Size Branching Programs Recognize Exactly Those Languages in *NC*. In Proc. of STOC '86, pp. 1-5, 1986.

D. Beaver. Minimal-Latency Secure Function Evaluation. In Proc. of Eurocrypt '00, pp. 335-350. Springer, 2000.

J.D.C. Benaloh. Verifiable Secret-Ballot Elections. Ph.D. thesis, Yale Univ., Dept. of Comp. Sci., 1988.

D. Boneh, R. Lipton. Searching for Elements in Black-Box Fields and Applications. In Proc of Crypto '96, LNCS 1109, pp. 283-297. Springer, 1996.

E.F. Brickell and Y. Yacobi. On Privacy Homomorphisms. In Proc. of Eurocrypt '87, LNCS 304, pp. 117-125. Springer, 1988.

R. Canetti, S. Hohenberger. Chosen-Ciphertext Secure Proxy Re-Encryption. In Proc. of ACM CCS '07, 2007.

(56) References Cited

OTHER PUBLICATIONS

W. van Dam, S. Hallgren, L. Ip. Quantum Algorithms for some Hidden Shift Problems. In Proc. of SODA '03, pp. 489-498, 2003. Full version in SIAM J. Comput. 36(3): pp. 763-778, 2006.

I. Damgard, M.J. Jurik. A Length-Flexible Threshold Cryptosystem with Applications. ACISP '03, LNCS 2727, pp. 350-356, 2003.

I. Damgard, J.B. Nielsen. Universally Composable Efficient Multiparty Computation from Threshold Homomorphic Encryption. In Proc. of Crypto '03, LNCS 2729, pp. 247-264. Springer, 2003.

M. van Dijk, S. Devadas. Interval Obfuscation. To be published as an MIT-CSAIL Technical Report in 2009.

I.B. Damgard, M.J. Jurik. A Length-Flexible Threshold Cryptosystem with Applications. BRICS Report Series, RS-03-16, ISSN 0909-0878, 2003.

T. ElGamal. A Public Key Cryptosystem and a Signature Scheme Based on Discrete Logarithms. Trans. on Info. Theory, vol. IT-31, No. 4, pp. 469-472, Jul. 1985.

M.R. Fellows, N. Koblitz. Combinatorial Cryptosystems Galore! In Contemporary Mathematics, vol. 168 of Finite Fields: Theory, Applications, and Algorithms, FQ2, pp. 51-61, 1993.

S. Goldwasser, D. Kharchenko. Proof of Plaintext Knowledge for the Ajtai-Dwork Cryptosystem. In Proc. of TCC 2005, pp. 529-555, 2005.

S. Goldwasser, S. Micali. Probabilistic Encryption & How to Play Mental Poker Keeping Secret All Partial Information. In Proc of STOC '82, pp. 365-377, 1982.

J. Kilian. A Note on Efficient Zero-Knowledge Proofs and Arguments. In Proc. of STOC '92, pp. 723-732, 1992.

J. Kilian. Improved Efficient Arguments. In Proc. of Crypto '95, LNCS 963, pp. 311-324, 1995.

F. Levy-dit-Vehel and L. Ferret. A Polly Cracker system based on Satisfiability. In Coding, Crypt. and Comb., Prog. in Comp. Sci. and App. Logic, v. 23, pp. 177-192, 2003.

H. Lipmaa. An Oblivious Transfer Protocol with Log-Squared Communication. In Proc. of ICS '05 pp. 314-328, 2005.

L. Van Ly. Polly Two—A Public-Key Cryptosystem based on Polly Cracker, Ph.D. thesis, Ruhr-University at Bochum, Bochum, Germany 2002.

L. Van Ly. Polly two : a new algebraic polynomial-based Public-Key Scheme. AAECC, 17: 267-283, 2006.

U. Maurer, D. Raub. Black-Box Extension Fields and the Inexistence of Field-Homomorphic One-Way Permutations. Asiacrypt '07, pp. 427-443, 2007.

D. Naccache, J. Stern. A New Public Key Cryptosystem Based on Higher Residues. ACM CCS '98, 1998.

T. Okamoto, S. Uchiyama. A New Public-Key Cryptosystem as Secure as Factoring. Eurocrypt '98, LNCS 1403, pp. 308-318, 1998.

P. Paillier. Public-Key Cryptosystems Based on Composite Degree Residuosity Classes. Eurocrypt '99, pp. 223-238, 1999.

C. Peikert, B. Waters. Lossy Trapdoor Functions and Their Applications. STOC '08, pp. 187-196, 2008.

A.C-C. Yao. How to Generate and Exchange Secrets. FOCS '86, pp. 162-167, 1986.

C. Peikert, B. Waters. Lossy Trapdoor Functions and Their Applications. (41 pp.), 2008.

Arora, Sanjeev, et al., "New Algorithms for Learning in Presence of Errors", Electronic Colloquium in Computational Complexity, Revision 1 of Report No. 66, 2010, 21 pgs.

Boyar, Joan, et al., "A depth-16 circuit for the AES S-box", http://eprint.iacr.org/2011/332, 2011, 11 pgs.

Brakerski, Zvika, "Fully Homomorphic Encryption without Modulus Switching from Classical GapSVP", In Advances in Cryptology, $32^{nd}$ Annual Cryptology Conference, Santa Barbara, CA, USA, Aug. 19-23, 2012, 19 pgs.

Brakerski, Zvika, et al., "Fully Homomorphic Encryption without Bootstrapping", In Innovations in Theoretical Computer Science (ITCS'12), http://eprint.iacr.org/2011/277, 2012, 26 pgs.

Coron, Jean-Sebastien, et al., "Public Key Compression and Modulus Switching for Fully Homomorphic Encryption over the Integers", In Advances in Cryptology—EUROCRYPT 2012, vol. 7237 of Lecture Notes in Computer Science, 2012, 27 pgs.

Damgard, Ivan, et al., "Secure Multiparty AES (full paper)", In Proc. of Financial Cryptography 2010, vol. 6052 of LNCS, 2010, 14 pgs.

Damgard, Ivan, et al., "Multiparty Computation from Somewhat Homomorphic Encryption", Manuscript, 2011, 40 pgs.

Goldwasser, Shafi, et al., "Robustness of the Learning with Errors Assumption", In Innovations in Computer Science—ICS'10, Tsinghua Unviersity Press, 2010, 13 pgs.

Huang, Yan, et al., "Faster Secure Two-Party Computation Using Garbled Circuits", In $20^{th}$ USENIX Security Symposium, Aug. 2011, 16 pgs.

Nielsen, Jesper Buus., et al., "A New Approach to Practical Active-Secure Two-Party Computation", Feb. 14, 2012, 42 pgs.

Lindner, Richard, et al., "Better Key Sizes (and Attacks) for LWE-Based Encryption", In CT-RSA, vol. 6558 of Lecture Notes in Computer Science, 2011, 21 pgs.

Lopez-Alt, Adriana, et al., "On-the-Fly Multiparty Computation on the Cloud via Multikey Fully Homomorphic Encryption", In STOC. ACM, 2012, 16 pgs.

Micciancio, Daniele, et al., "Lattice-based Cryptography", Nov. 7, 2008, Springer 33 pgs.

Pinkas, Benny, et al., "Secure Two-Party Computation is Practical", In Proc. ASIACRYPT 2009, vol. 5912 of LNCS, 2009, 20 pgs.

Rivain, Matthieu, et al., "Provably Secure Higher-Order Masking of AES", In Proceedings of CHES, vol. 6225 of Lecture Notes in Computer Science, 2010, 19 pgs.

Hanaoka et al., "Identity-Based Hierarchical Strongly Key-Insulated Encryption and its Application", 2005 International Association for Cryptograph Research (have copy in reference folder (120 pages).

C. Mouilleron, "Automatic Generation of Fast and Certified Code for Polynomial Evaluation", 2011 Section 2.1 and Fig. 1(d).

Joy "On-Line Geometric Modeling NOtes: Bernstein Polynomials", University of California, Retrieved Nov. 24, 2012 from http://www.idav.ucdavis.edu/eduction/CAGDNotes/Bernstein-Polynomials.html.

Detar Homer's Rule for Polynomials. Retrieved Nov. 24, 2012 from http://www.physics.utah.edu/~detar/lessons/c++/array/node1.html.

Bostan et al., Fast Algorithms for Polynomial Solutions of Linear Differential Equations. Retrieved Nov. 30, 2012 from http://www.algo.inria.fr/bostan/publications/BoCISa05.pdf.

Weimerskirch (2006) "Generalizations of the Karatsuba Algorithm for Efficient Implementations", retrieved from http:///citeseerx.ist.psu.edu/viedoc/summary?doi=10.1.1.61.6211.

Gentry, C. "Computing Arbitrary Functions of Encrypted Data" Communications of the ACM, vol. 53, No. 3, Mar. 2010, pp. 97-105.

Catalano, Dario et al. "Privacy Aware Process of Encrypted Signals for Treating Sensitive Information—List and Definition of Relevant Primitives", Prov-Ware, Aug. 2009, 61 pages.

Dijk et al.; "Fully Homomorphic Encryption over the Integers", Cryptology ePrint Archive: Report 2009/616, Version: 20091214:101936 Dec. 11, 2009; pp. 1025 retrieved from the Internet: https://eprintiacr.org/eprint-bin/getfil.pl?entry=2009/616&version=20091214:101936&file=616.pdf (14/511507).

T. Sander; et al., Non-Interactive CryptoComputing for NC1. in 40th Annual Symposium on Foundations of Computer Science; pp. 554-567 IEEE, 1999 (U.S. Appl. No. 14/511,507).

R. Yoshida et al. On the Private Searching Over Encrypted Data—Does PKE really allow PIR?, Oct. 31, 2007; Information Processing Socieet of Japan, Computer Security Symposium, No. 10, pp. 295-300 (U.S. Appl. No. 14/511,507).

Kobayashi et al., "Anonymous Hierarchical Identity-Based Encryption and It's Application"< Jan. 23, 2009; SCS 2009, 1C2-4; pp. 1-6 (U.S. Appl. No. 14/511,507).

G. Revy, Implementaiton of Binary Floating-Point Arithmetic on Embedded Integer Processors & mdash, Polynomial Evaluation-Based Algorithms and Certified Code Generation, PhD disseration, Universite, de Lyon&mdas, E, cole Normale Supe,rieure de Lyon, Dec. 2009 (U.S. Appl. No. 13/205,744).

(56) References Cited

OTHER PUBLICATIONS

"Arithmetic Circuit Complexity—Wikipedia, the free encyclopedia", en.wikipedia.org/wiki/Arithmetic_circuit_complexity, old revision of the page Feb. 17, 2011.

Klivans, Adam R. & Shpilka, Amir. "Learning Restricted Models of Arithmetic Circuits", Theory of Computing, Sep. 28, 2006, vol. 2, pp. 185-206.

* cited by examiner

SwitchModulus(($c_0$, $c_1$), $t$, $v$):   // ($c_0$, $c_1$) is a ciphertext, $t$ is an index of a modulus $q_t$
                                           // and $\nu$ is the noise estimate
1. If $t < 1$ then abort;                  // Sanity check
2. $v' \leftarrow q_{t-1}/q_t \cdot v + B_{scale}$;
3. If $v' > q_{t-1}/2c_m$ then abort;      // Another sanity check
4. $c'_i \leftarrow$ Scale($c_i$, $q_t$, $q_{t-1}$) for $i = 0, 1$;  // Scale down the vector
5. Output (($c'_0$, $c'_1$), $t - 1, v'$).

FIG. 5

SwitchKey$_{(b,a)}$(($d_0$, $d_1$, $d_2$), $t$, $v$):

1. Set $\begin{pmatrix} c'_0 \\ c'_1 \end{pmatrix} \leftarrow \left[ \left[ \begin{pmatrix} Pd_0 & b \\ Pd_1 & a \end{pmatrix} \begin{pmatrix} 1 \\ d_2 \end{pmatrix} \right]_{Q_t} \right]$ ;   // The actual key-switching operation
2. $c''_i \leftarrow$ Scale($c'_i$, $Q_t$, $q_t$) for $i = 0, 1$;   // Scale the vector back down to $q_t$
3. $v' \leftarrow v + B_{Ks} \quad q_t/P + B_{scale}$;   // The constant $B_{Ks}$
4. Output (($c''_0$, $c''_1$), $t$, $v'$).

FIG. 6

Mult(c, c'):
1. While $v(c) > B$ do $c \leftarrow$ SwitchModulus(c);         // $v(c)$ is the noise estimate in $c$
2. While $v(c') > B$ do $c' \leftarrow$ SwitchModulus(c');         // $v(c')$ is the noise estimatte in $c'$
3. Bring $c, c'$ to the same level $t$ by reducing modulo the smaller of the two moduli
   Denote after modular reduction $c = ((c_0, c_1), t, v)$ and $c' = ((c'_0, c'_1), t, v')$
4. Set $(d_0, d_1, d_2) \leftarrow (c_0 \cdot c'_0, \ c_1 \cdot c'_0 + c_0 \cdot c'_1, \ -c_1 \cdot c'_1)$;
   Denote $c'' = ((d_0, d_1, d_2), t, v \cdot v')$
5. Output SwitchKey$_{W[s^2 \to s]}(c'')$         // Convert to "normal" ciphertext

FIG. 7

| L | N | $log_2(p_0)$ | $log_2(p_i)$ | $log_2(p_{L-1})$ | $log_2(P)$ |
|---|---|---|---|---|---|
| 10 | 9326 | 37.1 | 17.9 | 7.5 | 177.3 |
| 20 | 19434 | 38.1 | 18.4 | 8.1 | 368.8 |
| 30 | 29749 | 38.7 | 18.7 | 8.4 | 564.2 |
| 40 | 40199 | 39.2 | 18.9 | 8.6 | 762.2 |
| 50 | 50748 | 39.5 | 19.1 | 8.7 | 962.1 |
| 60 | 61376 | 39.8 | 19.2 | 8.9 | 1163.5 |
| 70 | 72071 | 40.0 | 19.3 | 9.0 | 1366.1 |
| 80 | 82823 | 40.2 | 19.4 | 9.1 | 1569.8 |
| 90 | 93623 | 40.4 | 19.5 | 9.2 | 1774.5 |

FIG. 8

| | | n = 8 | | | | n = 1 | | |
|---|---|---|---|---|---|---|---|---|
| L | m | N = φ(m) | (d, f) | $c_K$ | m | N = φ(m) | (d, f) | $c_K$ |
| 10 | 11441 | 10752 | (48,244) | 3.60 | 11023 | 10800 | (45,240) | 5.13 |
| 20 | 34323 | 21504 | (48,448) | 6.93 | 34323 | 21504 | (48,448) | 6.93 |
| 30 | 31609 | 31104 | (72,432) | 5.15 | 32377 | 32376 | (57,568) | 1.27 |
| 40 | 54485 | 40960 | (64,640) | 12.40 | 42799 | 42336 | (21,2016) | 5.95 |
| 50 | 59527 | 51840 | (72,720) | 21.12 | 54161 | 52800 | (60,880) | 4.59 |
| 60 | 68561 | 62208 | (72,864) | 36.34 | 85865 | 63360 | (60,1056) | 12.61 |
| 70 | 82603 | 75264 | (56,1344) | 36.48 | 82603 | 75264 | (56,1344) | 36.48 |
| 80 | 92837 | 84672 | (56,1512) | 38.52 | 101437 | 85672 | (42,2016) | 19.13 |
| 90 | 124645 | 98304 | (48,2048) | 21.07 | 95281 | 94500 | (45,2100) | 6.22 |

FIG. 9

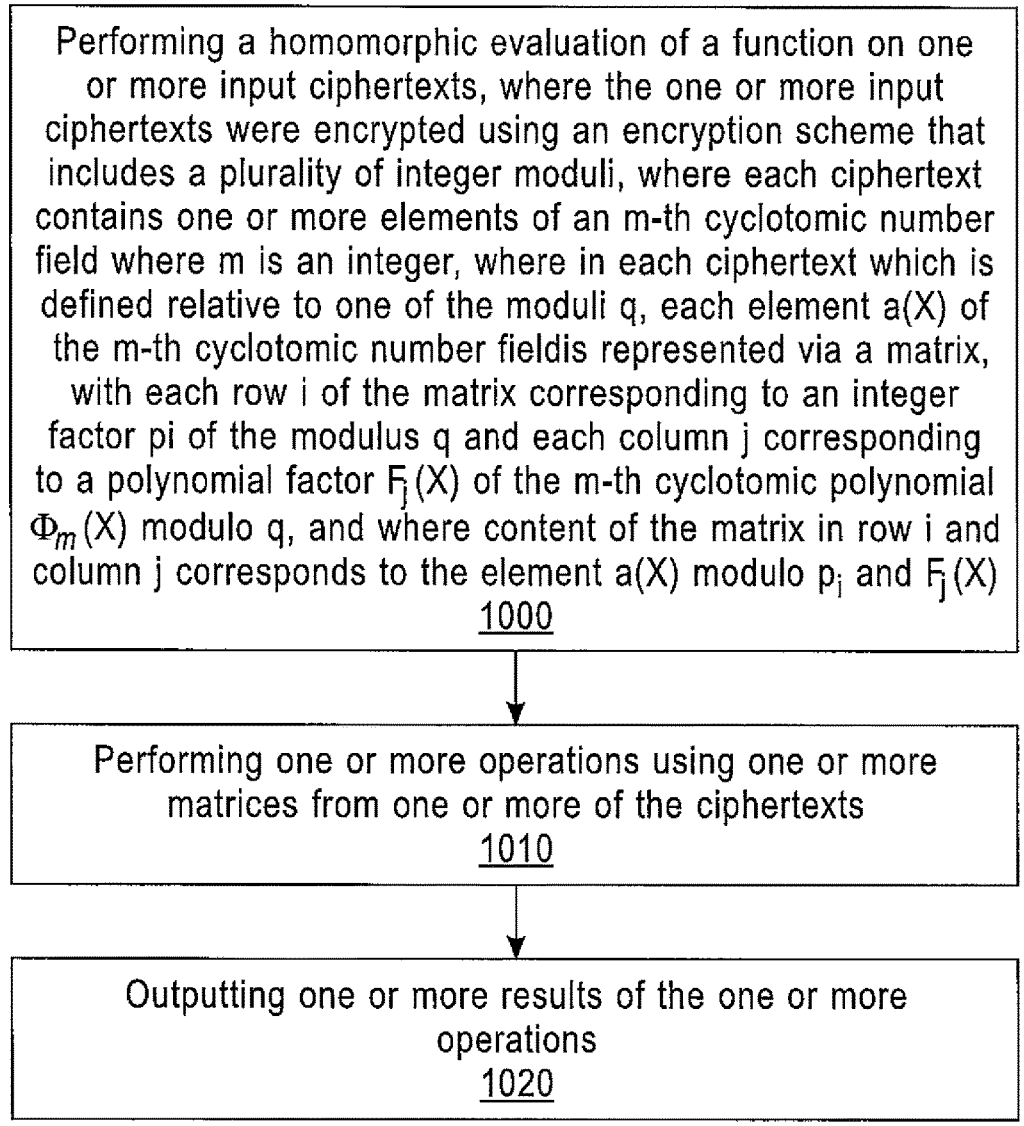

Performing a homomorphic evaluation of a function on one or more input ciphertexts, where the one or more input ciphertexts were encrypted using an encryption scheme that includes a plurality of integer moduli, where each ciphertext contains one or more elements of an m-th cyclotomic number field where m is an integer, where in each ciphertext which is defined relative to one of the moduli q, each element a(X) of the m-th cyclotomic number fieldis represented via a matrix, with each row i of the matrix corresponding to an integer factor pi of the modulus q and each column j corresponding to a polynomial factor $F_j(X)$ of the m-th cyclotomic polynomial $\Phi_m(X)$ modulo q, and where content of the matrix in row i and column j corresponds to the element a(X) modulo $p_i$ and $F_j(X)$
1000

Performing one or more operations using one or more matrices from one or more of the ciphertexts
1010

Outputting one or more results of the one or more operations
1020

FIG. 10

HOMOMORPHIC EVALUATION INCLUDING KEY SWITCHING, MODULUS SWITCHING, AND DYNAMIC NOISE MANAGEMENT

CROSS-REFERENCE TO RELATED APPLICATIONS

The present application is a divisional of application Ser. No. 13/746,713, filed on Jan. 22, 2013, now U.S. Pat. No. 9,281,941, which claims the benefit under 35 U.S.C. §119(e) of U.S. Provisional Patent Application No. 61/600,265, filed on Feb. 17, 2012, the disclosures of which are hereby incorporated by reference in their entirety.

STATEMENT REGARDING FEDERALLY SPONSORED RESEARCH OR DEVELOPMENT

This invention was made with Government support under Contract No.: FA8750-11-C-0096 (Defense Advanced Research Projects Agency (DARPA)). This invention was made with Government support under agreement FA8750-11-2-0079 from DARPA and the Air Force Research Laboratory (AFRL). The Government has certain rights in this invention.

BACKGROUND

This invention relates generally to encryption techniques and, more specifically, relates to homomorphic encryption techniques.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

In his breakthrough result, Gentry demonstrated that fully-homomorphic encryption was theoretically possible, assuming the hardness of some problems in integer lattices. See [13] below, in a section entitled "References". A reference or references is or are indicted by a number within square brackets or multiple numbers within square brackets, respectively. Since then, many different improvements have been made, for example authors have proposed new variants, improved efficiency, suggested other hardness assumptions, and the like. Some of these works were accompanied by implementation, but all the implementations so far were either "proofs of concept" that can compute only one basic operation at a time (e.g., at great cost), or special-purpose implementations limited to evaluating very simple functions. See [26, 14, 8, 27, 19, 9].

BRIEF SUMMARY

In an exemplary embodiment, a method is disclosed that includes performing homomorphic evaluation of a function on one or more input ciphertexts, where the one or more input ciphertexts were encrypted using a public key of an encryption scheme that also comprises a plurality of secret keys and a plurality of moduli, where the moduli are integers. Performing the homomorphic evaluation of the function comprises performing one or more operations on the input ciphertexts. Performing the one or more operations comprises: performing a key-switching transformation on selected ones of the one or more input ciphertexts, where performing a key-switching transformation on a selected ciphertext comprises converting a first version of the selected ciphertext with respect to a first of the plurality of secret keys and a first modulus to a second version of the selected ciphertext with respect to a second of the plurality of secret keys and a second modulus, where the second modulus is an integer factor p times the first modulus, where p>1, and where each of the key switching transformations is performed prior to or after the one or more operations are evaluated; and outputting one or more results of the one or more operations.

An apparatus includes one or more memories comprising computer-readable program code and one or more processors. The one or more processors are configured, responsive to execution of the computer-readable program code, to cause the apparatus to perform the method of the preceding paragraph. A computer program product includes a computer readable storage medium having computer readable program code embodied therewith, the computer readable code comprising code for performing the method of the preceding paragraph.

An apparatus comprises means for performing homomorphic evaluation of a function on one or more input ciphertexts, where the one or more input ciphertexts were encrypted using a public key of an encryption scheme that also comprises a plurality of secret keys and a plurality of moduli, where the moduli are integers, and where the means for performing the homomorphic evaluation of the function comprises means for performing one or more operations on the input ciphertexts, and where the means for performing the one or more operations comprises: means for performing a key-switching transformation on selected ones of the one or more input ciphertexts, where performing a key-switching transformation on a selected ciphertext comprises converting a first version of the selected ciphertext with respect to a first of the plurality of secret keys and a first modulus to a second version of the selected ciphertext with respect to a second of the plurality of secret keys and a second modulus, where the second modulus is an integer factor p times the first modulus, where p>1, where each of the key switching transformations is performed prior to or after the one or more operations are evaluated; and means for outputting one or more results of the one or more operations.

Another method is described that includes performing homomorphic evaluation of a function on one or more input ciphertexts, where the one or more input ciphertexts were encrypted using a public key of an encryption scheme that also comprises a plurality of secret keys, Each input ciphertext comprises a plurality of real numbers that are kept with finite precision. Performing the homomorphic evaluation of the function comprises performing one or more operations, and where performing each of one or more operations comprises: performing a key-switching transformation on selected ones of the one or more input ciphertexts, where performing key-switching transformation on a selected ciphertext comprises converting a first version of the selected ciphertext with respect to a first of the plurality of secret keys and with some number r bits of precision to a second version of the selected ciphertext with respect to a second of the plurality of secret keys and with some other number r' bits of precision, where r'>r, where each of the key switching transformations is performed prior to or after the one or more operations are evaluated; and outputting one or more results of the one or more operations.

An apparatus includes one or more memories comprising computer-readable program code and one or more processors. The one or more processors are configured, responsive to execution of the computer-readable program code, to cause the apparatus to perform the method of the preceding paragraph. A computer program product includes a computer readable storage medium having computer readable program code embodied therewith, the computer readable code comprising code for performing the method of the proceding paragraph.

Another apparatus is described that includes means for performing homomorphic evaluation of a function on one or more input ciphertexts, where the one or more input ciphertexts were encrypted using a public key of an encryption scheme that also comprises a plurality of secret keys, Each input ciphertext comprises a plurality of real numbers that are kept with finite precision. The means for performing the homomorphic evaluation of the function comprises means for performing one or more operations, and where the means for performing each of one or more operations comprises: means for performing a key-switching transformation on selected ones of the one or more input ciphertexts, where performing key-switching transformation on a selected ciphertext comprises converting a first version of the selected ciphertext with respect to a first of the plurality of secret keys and with some number r bits of precision to a second version of the selected ciphertext with respect to a second of the plurality of secret keys and with some other number r' bits of precision, where r'>r, where each of the key switching transformations is performed prior to or after the one or more operations are evaluated; and means for outputting one or more results of the one or more operations.

An additional exemplary embodiment is a method that includes performing a homomorphic evaluation of a function on one or more input ciphertexts, where the one or more input ciphertexts were encrypted using an encryption scheme that includes a plurality of integer moduli, where each ciphertext contains one or more elements of an m-th cyclotomic number field, where m is an integer, where each ciphertext which is defined relative to one of the moduli q, each element $a(X)$ of the m-th cyclotomic number field is represented via a matrix, with each row i of the matrix corresponding to an integer factor $p_i$ of the modulus q and each column j corresponding to a polynomial factor $F_j(X)$ of the m-th cyclotomic polynomial $\Phi_m(X)$ modulo q, and where content of the matrix in row i and column j corresponds to the element $a(X)$ modulo $p_i$ and $F_j(X)$, and where performing the homomorphic evaluation of the function further comprises performing one or more operations using one or more matrices from one or more of the ciphertexts.

An apparatus includes one or more memories comprising computer-readable program code and one or more processors. The one or more processors are configured, responsive to execution of the computer-readable program code, to cause the apparatus to perform the method of the preceding paragraph. A computer program product includes a computer readable storage medium having computer readable program code embodied therewith, the computer readable code comprising code for performing the method of the preceding paragraph.

An additional exemplary embodiment is an apparatus that includes means for performing a homomorphic evaluation of a function on one or more input ciphertexts, where the one or more input ciphertexts were encrypted using an encryption scheme that includes a plurality of integer moduli, where each ciphertext contains one or more elements of an m-th cyclotomic number field, where m is an integer, where each ciphertext which is defined relative to one of the moduli q, each element $a(X)$ of the m-th cyclotomic number field is represented via a matrix, with each row i of the matrix corresponding to an integer factor $p_i$ of the modulus q and each column j corresponding to a polynomial factor $F_j(X)$ of the m-th cyclotomic polynomial $\Phi_m(X)$ modulo q, and where content of the matrix in row i and column j corresponds to the element $a(X)$ modulo $p_i$ and $F_j(X)$, and where the means for performing the homomorphic evaluation of the function further comprises means for performing one or more operations using one or more matrices from one or more of the ciphertexts.

A further method is disclosed that includes performing homomorphic evaluation of a function on one or more input ciphertexts, where the one or more input ciphertexts were encrypted using a public key of an encryption scheme that also comprises a plurality of secret keys and a plurality of moduli. The moduli are integers. Performing the homomorphic evaluation comprises performing one or more operations, where performing each of one or more operations comprises: selecting one or more ciphertexts and determining an estimate of noise in the selected ciphertexts; for each one of the selected ciphertexts, in response to a determination the noise magnitude meets at least one criterion, performing a modulus switching operation on the ciphertext to convert the ciphertext from one of the plurality of secret keys and a first modulus into a second ciphertext with respect to a same secret key but a second modulus, and updating the noise estimate following the modulus switching operation; performing one additional homomorphic evaluation operations on the selected ciphertexts; computing the noise estimate for the result of the homomorphic operation from the noise estimate of the selected one or more ciphertexts; and outputting the result of the homomorphic operation together with its noise estimate.

An apparatus includes one or more memories comprising computer-readable program code and one or more processors. The one or more processors are configured, responsive to execution of the computer-readable program code, to cause the apparatus to perform the method of the preceding paragraph. A computer program product includes a computer readable storage medium having computer readable program code embodied therewith, the computer readable code comprising code for performing the method of the preceding paragraph.

A further apparatus is disclosed that includes means for performing homomorphic evaluation of a function on one or more input ciphertexts, where the one or more input ciphertexts were encrypted using a public key of an encryption scheme that also comprises a plurality of secret keys and a plurality of moduli. The moduli are integers. The means for performing the homomorphic evaluation comprises means for performing one or more operations, where the means for performing each of one or more operations comprises: means for selecting one or more ciphertexts and determining an estimate of noise in the selected ciphertexts; means, for each one of the selected ciphertexts and responsive to a determination the noise magnitude meets at least one criterion, for performing a modulus switching operation on the ciphertext to convert the ciphertext from one of the plurality of secret keys and a first modulus into a second ciphertext with respect to a same secret key but a second modulus, and means for updating the noise estimate following the modulus switching operation; means for performing one additional homomorphic evaluation operations on the selected ciphertexts; means for computing the noise estimate for the result of the homomorphic operation from the noise estimate of the selected one or more ciphertexts; and means for outputting the result of the homomorphic operation together with its noise estimate.

BRIEF DESCRIPTION OF THE SEVERAL VIEWS OF THE DRAWINGS

FIG. 5 shows pseudo-code for exemplary modulus switching;

FIG. 6 shows pseudo-code for an exemplary SwitchKey procedure;

FIG. 7 shows pseudo-code for an exemplary multiplication procedure;

FIG. 8 is a table of results for k=80-bits of security and for several different depth parameters L;

FIG. 9 is a table having concrete values for two situations for experiments, where the first situation corresponds to performing arithmetic on bytes in $F_{2^8}$ (i.e., n=8), and the second situation corresponds to arithmetic on bits in $F_2$ (i.e., n=1); and FIG. 10 is a logic flow diagram that illustrates the operation of an exemplary method, a result of execution of computer program instructions embodied on a computer readable memory, and/or functions performed by logic implemented in hardware, in accordance with exemplary embodiments of this invention.

DETAILED DESCRIPTION

Before proceeding with additional description of the exemplary embodiments, it is helpful to provide an overview of a system in which the exemplary embodiments may be performed and exemplary operations performed by such a system. A system herein performs homomorphic evaluation of ciphertext in order to perform operations on the ciphertext. The homomorphic evaluation is performed without the secret key used to encrypt the ciphertext.

Figure 1:
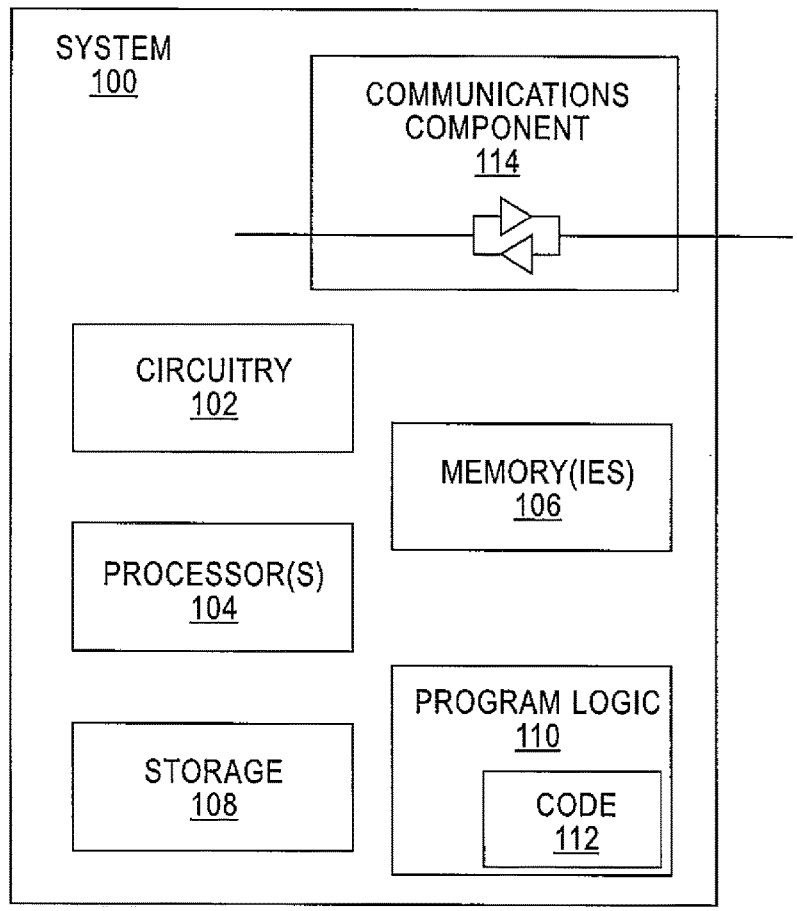
FIG. 1 illustrates a block diagram of an exemplary system in which various exemplary embodiments of the invention may be implemented.

Turning to FIG. 1, this figure illustrates a block diagram of an exemplary system in which various exemplary embodiments of the invention may be implemented. The system 100 may include at least one circuitry 102 (such as an integrated circuit) that may in certain exemplary embodiments include one or more processors 104. The system 100 may also include one or more memories 106 (e.g., a volatile memory device, a non-volatile memory device), and may include at least one storage 108. The storage 108 may include a non-volatile memory device such as a magnetic disk drive, an optical disk drive and/or a tape drive, as non-limiting examples. The storage 108 may comprise an internal storage device, an attached storage device and/or a network accessible storage device, as non-limiting examples. The system 100 may include program logic 110 including code 112 (e.g., computer-readable program code) that may be loaded into the memory 106 and executed by the processor 104 and/or circuitry 102. In certain exemplary embodiments, the program logic 110, including code 112, may be stored in the storage 108. In certain other exemplary embodiments, the program logic 110 may be implemented in the circuitry 102. Therefore, while FIG. 1 shows the program logic 110 separately from the other elements, the program logic 110 may be implemented in the memory 106 and/or the circuitry 102, as non-limiting examples.

The system 100 may include at least one communications component 114 that enables communication with at least one other component, system, device and/or apparatus. As non-limiting examples, the communications component 114 may include a transceiver configured to send and receive information, a transmitter configured to send information and/or a receiver configured to receive information. As a non-limiting example, the communications component 114 may comprise a modem or network card. The system 100 of FIG. 1 may be embodied in a computer or computer system, such as a desktop computer, a portable computer or a server, as non-limiting-examples. The components of the system 100 shown in FIG. 1 may be connected or coupled together using one or more internal buses, connections, wires and/or (printed) circuit boards, as non-limiting examples.

It should be noted that in accordance with the exemplary embodiments of the invention, one or more of the circuitry 102, processor(s) 104, memory 106, storage 108, program logic 110 and/or communications component 114 may store one or more of the various items (e.g., public/private key(s), ciphertexts, encrypted items, matrices, variables, equations, formula, operations, operational logic, logic) discussed herein. As a non-limiting example, one or more of the above-identified components may receive and/or store the plaintext (e.g., to be encrypted or resulting from decryption) and/or the ciphertext (e.g., to be decrypted, to be operated on homomorphically, or resulting from encryption). As a further non-limiting example, one or more of the above-identified components may receive and/or store the encryption function(s) and/or the decryption function(s), as described herein.

The exemplary embodiments of this invention may be carried out by computer software implemented by the processor 104 or by hardware, or by a combination of hardware and software. As a non-limiting example, the exemplary embodiments of this invention may be implemented by one or more integrated circuits. The memory 106 may be of any type appropriate to the technical environment and may be implemented using any appropriate data storage technology, such as optical memory devices, magnetic memory devices, semiconductor based memory devices, fixed memory and removable memory, as non-limiting examples. The processor(s) 104 may be of any type appropriate to the technical environment, and may encompass one or more of microprocessors, general purpose computers, special purpose computers and processors based on a multi-core architecture, as non limiting examples.

Homomorphic evaluation using a homomorphic encryption scheme has numerous applications. For example, it enables private search engine queries where the search engine responds to a query without knowledge of the query, i.e., a search engine can provide a succinct encrypted answer to an encrypted (e.g., Boolean) query without knowing what the query was. It also enables searching on encrypted data; one can store encrypted data on a remote server and later have the server retrieve only files that (when decrypted) satisfy some Boolean constraint, even though the server cannot decrypt the files on its own. More broadly, homomorphic encryption may improve the efficiency of secure multiparty computation.

Figure 2:
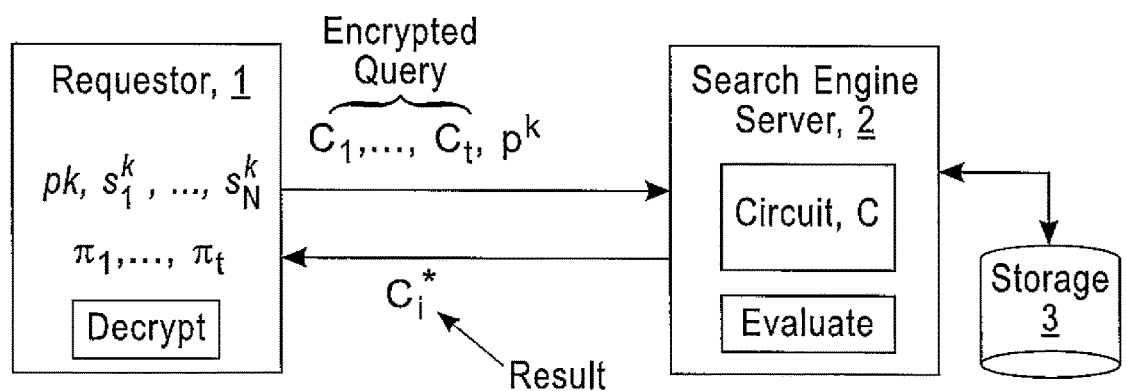
FIG. 2 illustrates a simple block diagram of a requestor and a server, such as a search engine, that use the fully homomorphic encryption scheme in accordance with possible exemplary embodiments of this invention.

One non-limiting application of homomorphic evaluation using a homomorphic encryption scheme is in a two-party setting. As previously described, a simple example is making encrypted queries to search engines. Referring to FIG. 2, to perform an encrypted search a party (requestor 1) generates a public key pk (and a plurality, N, of secret keys, $s^k$) for the homomorphic encryption scheme, and generates ciphertexts $c_1, \ldots, c_t$ that encrypt the query $\pi_1, \ldots, \pi_t$ under pk. For example, each $\pi_i$ could be a single bit of the query. Now, let the circuit C express a search engine server 2 search function for data stored in storage 3. The server 2 sets $c^*_i \leftarrow$ Evaluate($p^k, C_i, c_1, \ldots, c_t$), where $C_i$ is the sub-circuit of C that computes the i'th bit of the output. Note that, in practice, the evaluation of $c^*_i$ and $c^*_j$ may share intermediate results, in which case it may be needlessly inefficient to run independent instances of the Evaluate algorithm. The server 2 sends these ciphertexts to the requestor 1. It is known that Decrypt($s^k, c^*_i$)=$C_i(\pi_1, \ldots, \pi_t)$. These latter values constitute precisely the answer to the query, which is recoverable through decryption.

As another non-limiting application, the exemplary embodiments of this invention enable searching over encrypted data. In this scenario, assume that the requestor 1 stores files on the server 2 (e.g., on the Internet), so that the requestor 1 can conveniently access these files without needing the requestor's computer. However, the requestor encrypts the files, otherwise the server 2 could potentially read the private data. Let bits $\pi_1, \ldots, \pi_t$ represent the files, which are encrypted in the ciphertexts $c_1, \ldots, c_t$. Assume then that the requestor 1 later wants to download all encrypted files that satisfy a query, e.g., all files containing the word 'homomorphic' within 5 words of 'encryption', but not the word 'evoting'. The requestor 1 sends the query to the server 2, which expresses it as a circuit C. The server sets $c^*_i \leftarrow$ Evaluate($p^k, C_i, c_1, \ldots, c_t$) and sends these ciphertexts to the requestor 1, which decrypts the returned ciphertexts to recover $C(\pi_1, \ldots, \pi_t)$, the (bits of the) files that satisfy the query.

Note that in this application, as in the encrypted search application, the requestor provides the number of bits that the response should have, and the encrypted response from the server 2 is padded or truncated to meet the upper bound.

Concerning additional description of the exemplary embodiments, in this disclosure is described the first implementation powerful enough to support an "interesting real world circuit". In an example, a variant is implemented of the leveled FHE-without-bootstrapping scheme of [5], with support for deep enough circuits so that one can evaluate an entire AES-128 encryption operation. For this implementation both AES-specific optimizations as well as several "generic" tools for FHE evaluation are developed. These last tools include (among others) a different variant of the Brakerski-Vaikuntanathan key-switching technique that does not require reducing the norm of the ciphertext vector, and a method of implementing the Brakerski-Gentry-Vailmntanathan (BGV) modulus-switching transformation on ciphertexts in CRT representation.

For ease of reference, the instant disclosure is separated into sections.

1 Introduction

An exemplary implementation is based on a variant of the BGV scheme [5, 7, 6](based on ring-LWE [22]), using the techniques of Smart and Vercauteren (SV) [27] and Gentry, Halevi and Smart (GHS) [15], and many new optimizations are introduced herein. Some of our optimizations are specific to AES, and these are described in Section 4. Most of our optimization, however, are more general-purpose and can be used for homomorphic evaluation of other circuits, and these examples are described in Section 3.

Since the cryptosystem is defined over a polynomial ring, many of the operations involve various manipulation of integer polynomials, such as modular multiplications and additions and Frobenius maps. Most of these operations can be performed more efficiently in evaluation representation, when a polynomial is represented by the vector of values that it assumes in all the roots of the ring polynomial (for example polynomial multiplication is just point-wise multiplication of the evaluation values). On the other hand some operations in BGV-type cryptosystems (such as key switching and modulus switching) seem to require coefficient representation, where a polynomial is represented by listing all its coefficients. The need for coefficient representation ultimately stems from the fact that the noise in the ciphertexts is small in coefficient representation but not in evaluation representation. Hence a "naive implementation" of FHE would need to convert the polynomials back and forth between the two representations, and these conversions turn out to be the most time-consuming part of the execution. In our implementation we keep ciphertexts in evaluation representation at all times, converting to coefficient representation only when needed for some operation, and then converting back. Many of our general-purpose optimizations are aimed at reducing the number of FFTs and CRTs that we need to perform, by reducing the number of times that we need to convert polynomials between coefficient and evaluation representations.

We describe variants of key switching and modulus switching that can be implemented while keeping almost all the polynomials in evaluation representation. Our key-switching variant has another advantage, in that it significantly reduces the size of the key-switching matrices in the public key. This is particularly important since the main limiting factor for evaluating deep circuits turns out to be the ability to keep the key-switching matrices in memory. Other optimizations that we present are meant to reduce the number of modulus switching and key switching operations that we need to do. This is done by tweaking some operations (such as multiplication by constant) to get a slower noise increase, by "batching" some operations before applying key switching, and by attaching to each ciphertext an estimate of the "noisiness" of this ciphertext, in order to support better noise bookkeeping.

An exemplary implementation was based in 2011 on the NTL C++ library running over GMP, and we utilized a machine which consisted of a processing unit of Intel Xeon CPUs running at 2.0 GHz with 18 MB cache, and most importantly with 256 GB of RAM. It is expected that processing and memory requirements will be reduced over time.

Memory was our main limiting factor in the implementation. With this machine it took us just under two days to compute a single block AES encryption using an implementation choice which minimizes the amount of memory required; this is roughly two orders of magnitude faster than what could be done with the Gentry-Halevi implementation [14]. The computation was performed on ciphertexts that could hold 864 plaintext slots each; where each slot holds an element of $\mathbb{F}_{2^8}$. This means that we can compute $\lfloor 864/16 \rfloor = 54$ AES operations in parallel, which gives an amortize time per block of roughly forty minutes. A second (byte-sliced) implementation, requiring more memory, completed an AES operation in around five days; where ciphertexts could hold 720 different $\mathbb{F}_{2^8}$ slots (hence we can evaluate 720 blocks in parallel). This results in an amortized time per block of roughly five minutes.

We note that there are a multitude of optimizations that one can perform on our basic implementation. Most importantly, we believe that by using the "bootstrapping as optimization" technique from BGV [5] we can speed up the AES performance by an additional order of magnitude. Also, there are great gains to be had by making better use of parallelism: Unfortunately, the NTL library (which serves as an exemplary underlying software platform) is not thread safe, which severely limits our ability to utilize the multi-core functionality of modern multi-core processors. We expect that by utilizing many threads we can speed up some of our (higher memory) AES variants by as much as a 16× factor, just by letting each thread compute a different S-box lookup.

Regarding organization of the rest of this disclosure, in Section 2 we review the main features of BGV-type cryptosystems [6, 5], and briefly survey the techniques for homomorphic computation on packed ciphertexts from SV and GHS [27, 15]. Then in Section 3 we describe our "general-purpose" optimizations on a high level, with additional details provided in Appendices 5 and 6. A brief overview of AES and a high-level description and performance numbers is provided in Section 4.

2 Background 2.1 Notations and Mathematical Background

For an integer q we identify the ring $\mathbb{Z}/q\mathbb{Z}$ with the interval $(-q/2, q/2] \cap \mathbb{Z}$, and use $[z]_q$ to Denote the Reduction of the integer z Modulo q into that interval. Our implementation utilizes polynomial rings defined by cyclotomic polynomials, $\mathbb{A} = \mathbb{Z}[X]/\Phi_m(X)$. The ring $\mathbb{A}$ is the ring of integers of the m th cyclotomic number field $\mathbb{Q}(\zeta_m)$. We let $\mathbb{A}_q \stackrel{\text{def}}{=} \mathbb{A}/q\mathbb{A} = \mathbb{Z}[X]/(\Phi_m(X), q)$ for the (possibly composite) integer q, and we identify $\mathbb{A}_q$ with the set of integer polynomials of degree up to $\phi(m)-1$ reduced modulo q.

Coefficient Vs. Evaluation Representation.

Let m,q be two integers such that $\mathbb{Z}/q\mathbb{Z}$ contains a primitive m-th root of unity, and denote one such primitive m-th root of unity by $\zeta \in \mathbb{Z}/q\mathbb{Z}$. Recall that the m'th cyclotomic polynomial splits into linear terms modulo q, $$\Phi_m(X) = \Pi_{i \in (\mathbb{Z}/m\mathbb{Z})^*}(X - \zeta^i) \pmod{q}.$$

We consider two ways of representing an element $a \in \mathbb{A}_q$. One representation is performed by viewing a as a degree-$(\phi(m)-1)$ polynomial, $a(X) = \Sigma_{i<\phi(m)} a_i X^i$, the coefficient representation of a just lists all the coefficients in order, $a = \langle a_0, \ldots, a_{\phi(m)-1}\rangle \in (\mathbb{Z}/q\mathbb{Z})^{\phi(m)}$. For the other representation, we consider the values that the polynomial a(X) assumes on all primitive m-th roots of unity modulo q, $b_i = a(\zeta^i) \bmod q$ for $i \in (\mathbb{Z}/m\mathbb{Z})^*$. The $b_i$'s in order also yield a vector b, which we call the evaluation representation of a. Clearly these two representations are related via $b = V_m \cdot a$, where $V_m$ is the Vandermonde matrix over the primitive m-th roots of unity modulo q. We remark that for all i we have the equality a mod $(X-\zeta^i) = a(\zeta^i) = b_i$, hence the evaluation representation of a is just a polynomial Chinese-Remaindering representation.

In both representations, an element $a \in \mathbb{A}_q$ is represented by a $\phi(m)$-vector of integers in $\mathbb{Z}/q\mathbb{Z}$. If q s a composite then each of these integers can itself be represented either using the standard binary encoding of integers or using Chinese-Remaindering relative to the factors of q. We usually use the standard binary encoding for the coefficient representation and Chinese-Remaindering for the evaluation representation. (Hence the latter representation is really a double CRT representation, relative to both the polynomial factors of $\Phi_m(X)$ and the integer factors of q.)

2.2 BGV-Type Cryptosystems

An exemplary embodiment uses a variant of the BGV cryptosystem due to Gentry, Halevi and Smart, specifically the one described in [15, Appendix~D] (in the full version). In this cryptosystem both ciphertexts and secret keys are vectors over the polynomial ring $\mathbb{A}$, and the native plaintext space is the space of binary polynomials $\mathbb{A}_2$. (More generally the plaintext space could be $\mathbb{A}_p$ for some fixed $p \geq 2$, but in our case we will use $\mathbb{A}_2$.)

At any point during the homomorphic evaluation there is some "current integer modulus q" and "current secret key s", which change from time to time. A ciphertext c is decrypted using the current secret key s by taking inner product over $\mathbb{A}_q$ (with q the current modulus) and then reducing the result modulo 2 in coefficient representation. Namely, the decryption formula is $$a \leftarrow [[\langle c,s \rangle \bmod \Phi_m(X)]_q]_2. \tag{1}$$

The polynomial $[\langle c,s \rangle \bmod \Phi_m(X)]_q$ is called the "noise" in the ciphertext c. Informally, c is a valid ciphertext with respect to secret key s and modulus q if this noise has "sufficiently small norm" relative to q. The meaning of "sufficiently small norm" is whatever is needed to ensure that the noise does not wrap around q when performing homomorphic operations, in our implementation we keep the norm of the noise always below some pre-set bound (which is determined in Section 7.2).

Following [22, 15], the specific norm that we use to evaluate the magnitude of the noise is the "canonical embedding norm reduced mod q", specifically we use the conventions as described in [15, Appendix~D](in the full version). This is useful to get smaller parameters, but for the purpose of presentation the reader can think of the norm as the Euclidean norm of the noise in coefficient representation. More details are given in the Appendices. We refer to the norm of the noise as the noise magnitude.

The central feature of BGV-type cryptosystems is that the current secret key and modulus evolve as we apply operations to ciphertexts. We apply five different operations to ciphertexts during homomorphic evaluation. Three of them—addition, multiplication, and automorphism—are "semantic operations" that we use to evolve the plaintext data which is encrypted under those ciphertexts. The other two operations—key-switching and modulus-switching—are used for "maintenance": These operations do not change the plaintext at all, they only change the current key or modulus (respectively), and they are mainly used to control the complexity of the evaluation. Below we briefly describe each of these five operations on a high level. For the sake of self-containment, we also describe key generation and encryption in Section 6. More detailed description can be found in [15, Appendix~D].

Addition

Homomorphic addition of two ciphertext vectors with respect to the same secret key and modulus q is done just by adding the vectors over $\mathbb{A}_q$. If the two arguments were encrypting the plaintext polynomials $a_1, a_2 \in \mathbb{A}_2$, then the sum will be an encryption of $a_1 + a_2 \in \mathbb{A}_2$. This operation has no effect on the current modulus or key, and the norm of the noise is at most the sum of norms from the noise in the two arguments.

Multiplication

Homomorphic multiplication is done via tensor product over $A_q$. In principle, if the two arguments have dimension n over $A_q$ then the product ciphertext has dimension $n^2$, each entry in the output computed as the product of one entry from the first argument and one entry from the second. It was shown in [7] that over polynomial rings this operation can be implemented while increasing the dimension only to $2n-1$ rather than the expected $n^2$.

This operation does not change the current modulus, but it changes the current key: If the two input ciphertexts are valid with respect to the dimension-n secret key vector s, encrypting the plaintext polynomials $a_1, a_2 \in \mathbb{A}_2$, then the output is valid with respect to the dimension-$n^2$ secret key s' which is the tensor product of s with itself and it encrypts the polynomial $a_1 \cdot a_2 \in \mathbb{A}_2$. The norm of the noise in the product ciphertext can be bounded in terms of the product of norms of the noise in the two arguments. For our choice of norm function, the norm of the product is no larger than the product of the norms of the two arguments.

Key Switching

The public key of BGV-type cryptosystems includes additional components to enable converting a valid ciphertext with respect to one key into a valid ciphertext encrypting the same plaintext with respect to another key. For example, this is used to convert the product ciphertext which is valid with respect to a high-dimension key back to a ciphertext with respect to the original low-dimension key.

To allow conversion from dimension-n' key s' to dimension-n key s (both with respect to the same modulus q), we include in the public key a matrix $W = W[s' \to s]$ over $A_q$, where the i'th column of W is roughly an encryption of the i'th entry of s' with respect to s (and the current modulus). Then given a valid ciphertext c' with respect to s', we roughly compute $c = W \cdot c'$ to get a valid ciphertext with respect to s.

In some more detail, the BGV key switching transformation first ensures that the norm of the ciphertext c' itself is sufficiently low with respect to q. In [5] this was done by working with the binary encoding of c', and one of our main optimization in this work is a different method for achieving the same goal (cf. Section 3.1). Then, if the i'th entry in s' is $s'_i \in A$ (with norm smaller than q), then the i'th column of $W[s' \to s]$ is an n-vector $w_i$ such that $[\langle w_i, s \rangle \mod \Phi_m]_q = 2e_i + s'_i$ for a low-norm polynomial $e_i \in A$. Denoting $e = (e_1, \ldots, e_{n'})$, this means that we have $sW = s' + 2e$ over $A_q$. For any ciphertext vector c', setting $c = W \cdot c' \in A_q$ we get the equation:

$$[\langle c, s \rangle \mod \Phi_m(X)]_q = 2 [sWc' \mod \Phi_m(X)]_q = [\langle c', s' \rangle + 2 \langle c', e \rangle \mod \Phi_m(X)]_q,$$

Since c', e, and $[\langle c', s' \rangle \mod \Phi_m]_q$ all have low norm relative to q, then the addition on the right-hand side does not cause a wrap around q, hence we get $[[\langle c, s \rangle \mod \Phi_m]_q]_2 = [[\langle c', s' \rangle \mod \Phi_m]_q]_2$, as needed. The key-switching operation changes the current secret key from s' to s, and does not change the current modulus. The norm of the noise is increased by at most an additive factor of $2\|\langle c', e \rangle\|$.

Modulus Switching

The modulus switching operation is intended to reduce the norm of the noise, to compensate for the noise increase that results from all the other operations. To convert a ciphertext c with respect to secret key s and modulus q into a ciphertext c' encrypting the same thing with respect to the same secret key but modulus q', we roughly just scale c by a factor q'/q (thus getting a fractional ciphertext), then round appropriately to get back an integer ciphertext. Specifically, c' is a ciphertext vector satisfying (a) $c' \equiv c \pmod 2$, and (b) the "rounding error term" $\tau = c' - (q'/q)c$ has low norm. Converting c to c' is easy in coefficient representation, and one of our exemplary optimizations is a method for doing the same in evaluation representation (cf. Section 3.2) This operation leaves the current key s unchanged, changes the current modulus from q to q', and the norm of the noise is changed as $|v'| \leq (q'/q)|v| + \tau \cdot \|s\|$. Note that if the key s has low norm and q' is sufficiently smaller than q, then the noise magnitude decreases by this operation.

A BGV-type cryptosystem has a chain of moduli, $q_0 < q_1 \ldots < q_{L-1}$, where fresh ciphertexts are with respect to the largest modulus $q_{L-1}$. During homomorphic evaluation every time the (estimated) noise grows too large we apply modulus switching from $q_i$ to $q_{i-1}$ in order to decrease it back. Eventually we get ciphertexts with respect to the smallest modulus $q_0$, and we cannot compute on them anymore (except by using bootstrapping).

Automorphisms

In addition to adding and multiplying polynomials, another useful operation is converting the polynomial $a(X) \in \mathbb{A}$ to $a^{(i)}(X) \stackrel{\text{def}}{=} a(X^i) \mod \Phi_m(X)$. Denoting by $\kappa_i$ the transformation $\kappa_i : a \mapsto a^{(i)}$, it is a standard fact that the set of transformations $\{\kappa_i : i \in \mathbb{Z}/m\mathbb{Z}^*\}$ forms a group under composition (which is the Galois group $\mathcal{G}al\, \mathbb{Q}(\zeta_m)/\mathbb{Q}$), and this group is isomorphic to $(\mathbb{Z}/m\mathbb{Z})^*$. In [5, 15] it was shown that applying the transformations $\kappa_i$ to the plaintext polynomials is very useful, some more examples of its use can be found in Section 4.

Denoting by $c^{(i)}, s^{(i)}$ the vector obtained by applying $\kappa_i$ to each entry in c, s, respectively, it was shown in [5, 15] that if s is a valid ciphertext encrypting a with respect to key s and modulus q, then $c^{(i)}$ is a valid ciphertext encrypting $a^{(i)}$ with respect to key $s^{(i)}$ and the same modulus q. Moreover the norm of noise remains the same under this operation. We remark that we can apply key-switching to $c^{(i)}$ in order to get an encryption of $a^{(i)}$ with respect to the original key s.

2.3 Computing on Packed Ciphertexts

Smart and Vercauteren observed [26, 27] that the plaintext space $\mathbb{A}_2$ can be viewed as a vector of "plaintext slots", by an application the polynomial Chinese Remainder Theorem. Specifically, if the ring polynomial $\Phi_m(X)$ factors modulo 2 into a product of irreducible factors $\Phi_m(X) = \prod_{j=0}^{l-1} F_j(X) \pmod 2$, then a plaintext polynomial $a(X) \in \mathbb{A}_2$ can be viewed as encoding l different small polynomials, $a_j = a \mod F_j$. Just like for integer Chinese Remaindering, addition and multiplication in $\mathbb{A}_2$ correspond to element-wise addition and multiplication of the vectors of slots.

The effect of the automorphisms is a little more involved. When i is a power of two, then the transformations $\kappa_i : a \mapsto a^{(i)}$ is just applied to each slot separately. When i is not a power of two, the transformation $\kappa_i$ has the effect of roughly shifting the values between the different slots. For example, for some parameters we could get a cyclic shift of the vector of slots: If a encodes the vector $(a_0, a_1, \ldots, a_{l-1})$, then $\kappa_i(a)$ (for some i) could encode the vector $(a_{l-1}, a_0, \ldots, a_{l-2})$. This was used in [15] to devise efficient procedures for applying arbitrary permutations to the plaintext slots.

We note that the values in the plaintext slots are not just bits, rather they are polynomials modulo the irreducible $F_j$'s, so they can be used to represents elements in extension fields $GF(2^d)$. In particular, in some of our AES implementations we used the plaintext slots to hold elements of $GF(2^8)$, and encrypt one byte of the AES state in each slot. Then we can use an adaption of the techniques from [15] to permute the slots when performing the AES row-shift and column-mix.

3 General-Purpose Optimizations

Below we summarize our optimizations that are not tied directly to the AES circuit and can be used also in homomorphic evaluation of other circuits. Underlying many of these optimizations is our choice of keeping ciphertext and key-switching matrices in evaluation (double-CRT) representation. Our chain of moduli is defined via a set of primes of roughly the same size, $p_0, \ldots, p_{L-1}$, all chosen such that $\mathbb{Z}/p_i\mathbb{Z}$ has a m'th roots of unity. (In other words, $m|p_i-1$ for all i.) For $i=0, \ldots, L-1$ we then define our i'th modulus as $q_i=\Pi_{j=0}^{i} p_j$. The primes $p_0$ and $p_{L-1}$ are special ($p_0$ is chosen to ensure decryption works, and $p_{L-1}$ is chosen to control noise immediately after encryption), however all other primes $p_i$ are of size $2^{17} \leq p_i \leq 2^{20}$ if L<100, see Section 7 below.

In the t-th level of the scheme we have ciphertexts consisting of elements in $\mathbb{A}_{q_t}$ (i.e., polynomials modulo $(\Phi_m(X), q_t)$). We represent an element $c \in \mathbb{A}_{q_t}$ by a $\phi(m) \times (t+1)$ "matrix" of its evaluations at the primitive m-th roots of unity modulo the primes $p_0, \ldots p_t$. Computing this representation from the coefficient representation of c involves reducing c modulo the $p_i$'s and then t+1 invocations of the FFT algorithm, modulo each of the $p_i$ (picking only the FFT coefficients corresponding to $\mathbb{Z}/m\mathbb{Z})^*$). To convert back to coefficient representation we invoke the inverse FFT algorithm t+1 times, each time padding the $\phi(m)$-vector of evaluation point with $m-\phi(m)$ zero (for the evaluations at the non-primitive roots of unity). This yields the coefficients of t+1 polynomials modulo $(X^m-1, p_i)$ for $i=0, \ldots, t$, we then reduce each of these polynomials modulo $(\Phi_m(X), p_i)$ and apply Chinese Remainder interpolation. We stress that we try to perform these transformations as rarely as we can.

3.1 A New Variant of Key Switching

As described in Section 2, the key-switching transformation introduces an additive factor of $2\langle c',e\rangle$ in the noise, where c' is the input ciphertext and e is the noise component in the key-switching matrix. To keep the noise magnitude below the modulus q, it seems that we need to ensure that the ciphertext c' itself has low norm. In BGV [5] this was done by representing c' as a fixed linear combination of small vectors, i.e. $c'=\Sigma_i 2^i c'_i$ with $c'_i$ the vector of i'th bits in c'. Considering the high-dimension ciphertext $c^*=(c'_0|c'_1|c'_2|\ldots)$ and secret key $s^*=(s'|2s'|4s'|\ldots)$, we note that we have $\langle c^*, s^*\rangle (=\rangle c',s')$ and C has low norm (since it consists of 0-1 polynomials). BGV therefore included in the public key the matrix $W=W[s^* \to s]$ (rather than $W[s' \to s]$), and had the key-switching transformation computes $c^*$ from c' and sets $c=W \cdot c^*$.

When implementing key-switching, there are two drawbacks to the above approach. First, this increases the dimension (and hence the size) of the key switching matrix. This drawback is fatal when evaluating deep circuits, since having enough memory to keep the key-switching matrices turns out to be the limiting factor in our ability to evaluate these deep circuits. In addition, for this key-switching we must first convert c' to coefficient representation (in order to compute the $c'_i$'s), then convert each of the $c'_i$'s back to evaluation representation before multiplying by the key-switching matrix. In level t of the circuit, this seems to require $\Omega(t \log q_t)$ FFTs.

In this work we propose a different variant: Rather than manipulating c' to decrease its norm, we instead temporarily increase the modulus q. We recall that for a valid ciphertext c', encrypting plaintext a with respect to s' and q, we have the equality $\langle c',s'\rangle=2e'+a$ over $\mathbb{A}_q$, for a low-norm polynomial e'. This equality, we note, implies that for every odd integer p we have the equality $\langle c',ps'\rangle=2e''+a$, holding over $\mathbb{A}_{pq}$, for the "low-norm" polynomial e'' (namely $$\left(\text{namely } e'' = p \cdot e' + \frac{p-1}{2} a\right).$$

Clearly, when considered relative to secret key ps and modulus pq, the noise in c' is p times larger than it was relative to s and q. However, since the modulus is also p times larger, we maintain that the noise has norm sufficiently smaller than the modulus. In other words, c' is still a valid ciphertext that encrypts the same plaintext a with respect to secret key ps and modulus pq. By taking p large enough, we can ensure that the norm of c' (which is independent of p) is sufficiently small relative to the modulus pq.

We therefore include in the public key a matrix $W=W[ps' \to s]$ modulo pq for a large enough odd integer p. (Specifically we need $p \approx q\sqrt{m}$.) Given a ciphertext c', valid with respect to s and q, we apply the key-switching transformation simply by setting $c=W \cdot c'$ over $\mathbb{A}_{pq}$. The additive noise term $\langle c',e\rangle$ that we get is now small enough relative to our large modulus pq, thus the resulting ciphertext c is valid with respect to s and pq. We can now switch the modulus back to q (e.g., using our modulus switching routine described below), hence getting a valid ciphertext with respect to s and q.

We note that even though we no longer break c' into its binary encoding, it seems that we still need to recover it in coefficient representation in order to compute the evaluations of c' mod p. However, since we do not increase the dimension of the ciphertext vector, this procedure requires only O(t) FFTs in level t (vs. O(t log $q_t$)=O($t^2$) for the original BGV variant). Also, the size of the key-switching matrix is reduced by roughly the same factor of log $q_t$.

Our new variant comes with a price tag, however We use key-switching matrices relative to a larger modulus, but still need the noise term in this matrix to be small. This means that the LWE problem underlying this key-switching matrix has larger ratio of modulus/noise, implying that we need a larger dimension to get the same level of security than with the original BGV variant. In fact, since our modulus is more than squared (from q to pq with p>q), the dimension is increased by more than a factor of two. This translates to more than doubling of the key-switching matrix, partly negating the size and running time advantage that we get from this variant.

Figure 3A:
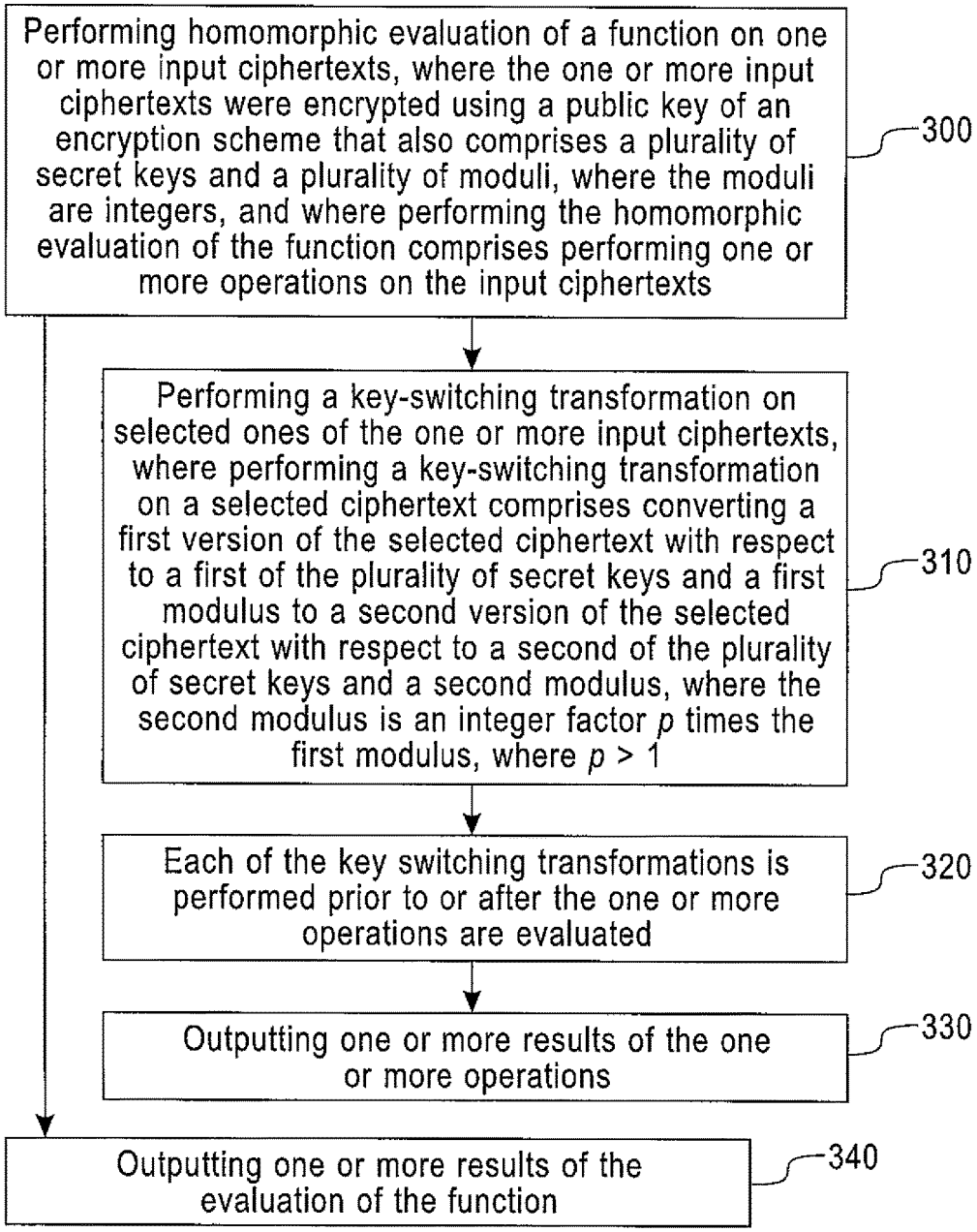
FIGS. 3A, 3B and 4 are logic flow diagrams that illustrate the operation of an exemplary method, a result of execution of computer program instructions embodied on a computer readable memory, and/or functions performed by logic implemented in hardware, in accordance with exemplary embodiments of this invention.

We comment that a hybrid of the two approaches could also be used: we can decrease the norm of c' only somewhat by breaking it into digits (as opposed to binary bits as in [5]), and then increase the modulus somewhat until it is large enough relative to the smaller norm of c'. Roughly, when we break the ciphertext into some number d of digits, we need the extra factor p to be $p \approx q^{1/d}$ or larger. We speculate that the optimal setting in terms of runtime is found around $p \approx \sqrt{q}$, but so far did not try to explore this tradeoff FIG. 3A is a flow diagram illustrating homomorphic evaluation with an example of the new variant of key switching described in this section. FIG. 3A is a logic flow diagram that illustrates the operation of an exemplary method, a result of execution of computer program instructions embodied on a computer readable memory, and/or functions performed by logic implemented in hardware, in accordance with exemplary embodiments of this invention.

Note that the flow in FIG. 3A may be performed by the system 100 (see FIG. 1), e.g., by the one or more processors 104 and/or circuitry 102, e.g., in response to execution of the code 112 in program logic 110. The system 100 may be the search engine server 2, in an exemplary embodiment. In block 300, the system 100 performs the operation of performing homomorphic evaluation of a function on one or more input ciphertexts. The one or more input ciphertexts were encrypted using a public key of an encryption scheme that also comprises a plurality of secret keys and a plurality of moduli, where the moduli are integers. The performing the homomorphic evaluation of the function comprises performing one or more operations on the input ciphertexts. In an example, a function is to be evaluated, where the function comprises one or multiple operations such as the semantic operations addition, multiplication, and automorphism, described above in Section 2.2. The function can be any arbitrary function, such as $(x_1^3+1)+(x_1 x_2)+x_2^7$ (as an example of an arbitrary function, where $x_1$ and $x_2$ are ciphertexts). As these functions are applied to ciphertext(s), the "maintenance" operations of key switching (see block 310) and modulus switching (described below) are applied to control the complexity of the homomorphic evaluation.

Blocks 310, 320, and 330 illustrate examples of performing one or more operations on the input ciphertexts. In block 310, the system 100 performs the operation of performing a key-switching transformation on selected ones of the one or more input ciphertexts. Performing a key-switching transformation on a selected ciphertext comprises converting a first version of the selected ciphertext with respect to a first of the plurality of secret keys and a first modulus to a second version of the selected ciphertext with respect to a second of the plurality of secret keys and a second modulus. The second modulus is an integer factor p times the first modulus, where p>1. In block 320, each of the key switching transformations is performed prior to or after the one or more operations are evaluated. That is, a key switching transformation may be performed, e.g., after a multiplication operation, after an automorphism, or before other operations (such as modulus switching). In block 330, the system 100 performs the operation of outputting one or more results of the one or more operations. The one or more results may be output to, e.g., the storage 108, the memories 106, or the communications component 114. In block 340, the system 100 performs the operation of outputting one or more results of the evaluation of the function.

Note that there could be multiple operations performed and multiple key-switching transformations performed for a single function. Thus, blocks 310-330 may be performed multiple times prior to block 340 being performed. Furthermore, as illustrated by FIG. 2, there may be a circuit, C, with a number of levels. For instance, there is a description below of an application to AES and its circuits. The functions may be performed in order to evaluate the circuit.

The same key-switching optimization can also be applied to the variant of the cryptosystem proposed by Zvika Brakersky, "Fully Homomorphic Encryption without Modulus Switching from Classical GapSVP", in Advances in Cryptology, 32nd Annual Cryptology Conference, Santa Barbara, Calif., USA, Aug. 19-23, 2012, and Lecture Notes in Computer Science 7417 Springer 2012 CRYPTO 2012, 868-886. In that variant, the different moduli are replaced by representing real numbers with different precision: instead of working modulo an m-bit modulus, we use real numbers with m bits of precision. In this other version, the role of a larger modulus is played by using more bits of precision, and switching to a smaller modulus is performed just by ignoring the least significant bits of the real number (hence using fewer bits of precision). Just as in the procedure above, a side-effect of the key-switching transformation is to increase the modulus from q to pq, using the same optimization for the Brakersky variant will increase the precision from log(q) bits to log(pq) bits. Just as above, if we break the ciphertext into d digits (each with log(q)/d bits of precision) then we need $p \sim q^{1/d}$.

Figure 3B:
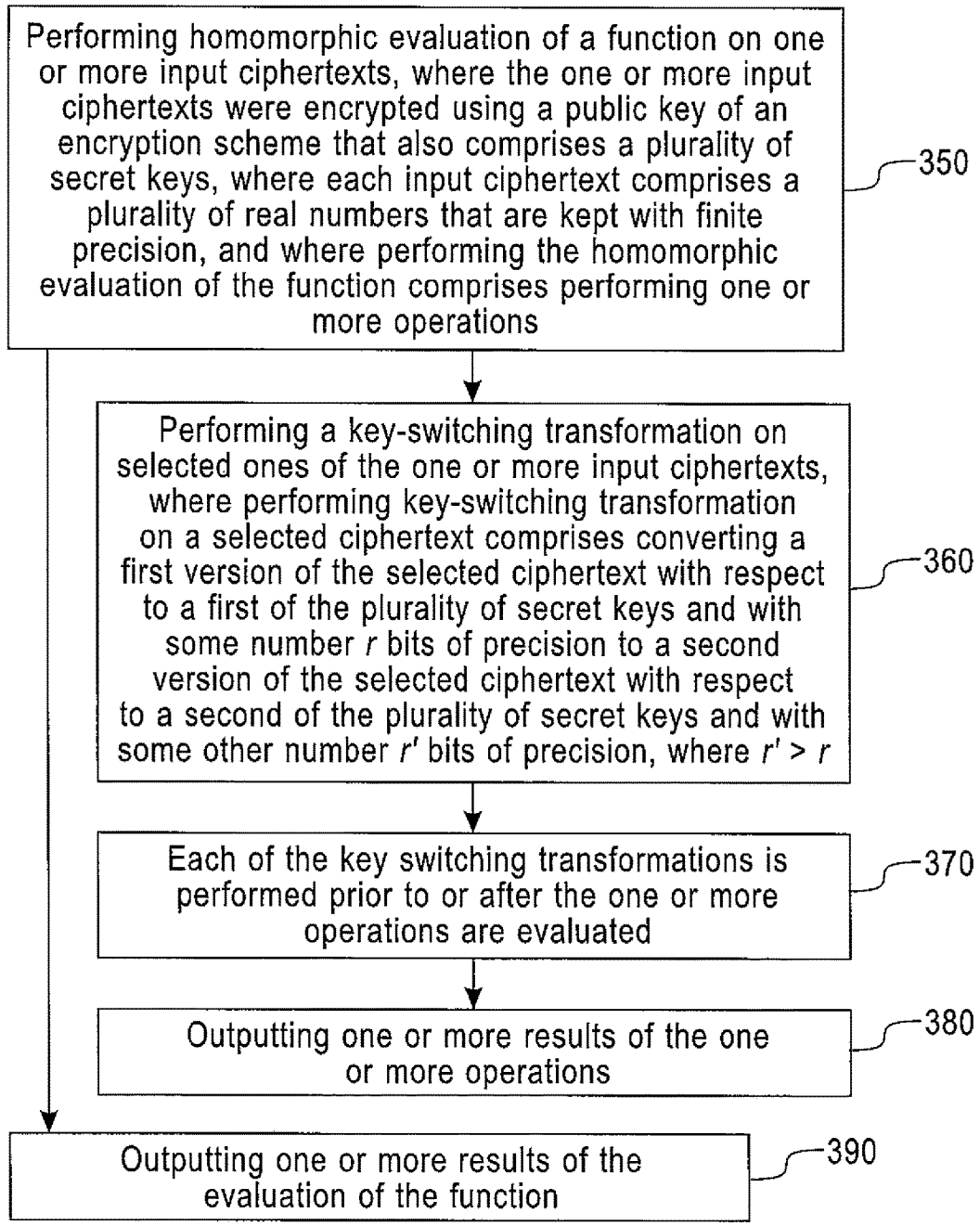

Commensurate with this, FIG. 3B is a flow diagram illustrating homomorphic evaluation with an example of a new variant of key switching described in herein. FIG. 3B is a logic flow diagram that illustrates the operation of an exemplary method, a result of execution of computer program instructions embodied on a computer readable memory, and/or functions performed by logic implemented in hardware, in accordance with exemplary embodiments of this invention.

The flow in FIG. 3B may be performed by the system 100 (see FIG. 1), e.g., by the one or more processors 104 and/or circuitry 102, e.g., in response to execution of the code 112 in program logic 110. The system 100 may be the search engine server 2, in an exemplary embodiment. In block 350, the system 100 performs the operation of performing homomorphic evaluation of a function on one or more input ciphertexts, where the one or more input ciphertexts were encrypted using a public key of an encryption scheme that also comprises a plurality of secret keys. Each input ciphertext comprises a plurality of real numbers that are kept with finite precision. Performing the homomorphic evaluation of the function comprises performing one or more operations. The function comprises one or multiple operations such as the semantic operations addition, multiplication, and automorphism, described above in Section 2.2, and the function can be any arbitrary function.

Blocks 360, 370, and 380 illustrate examples of performing one or more operations on the input ciphertexts. In block 360, the system 100 performs the operation of performing a key-switching transformation on selected ones of the one or more input ciphertexts. Performing the key-switching transformation on a selected ciphertext comprises converting a first version of the selected ciphertext with respect to a first of the plurality of secret keys and with some number r bits of precision to a second version of the selected ciphertext with respect to a second of the plurality of secret keys and with some other number r' bits of precision, where r'>r. In block 370, each of the key switching transformations is performed prior to or after the one or more operations are evaluated. That is, a key switching transformation may be performed, e.g., after a multiplication operation, after an automorphism, or before other operations (such as modulus switching). In block 380, the system 100 performs the operation of outputting one or more results of the one or more operations. The one or more results may be output to, e.g., the storage 108, the memories 106, or the communications component 114. In block 390, the system 100 performs the operation of outputting one or more results of the evaluation of the function.

Note that there could be multiple operations performed and multiple key-switching transformations performed for a single function. Thus, blocks 360-380 may be performed multiple times prior to block 390 being performed. Furthermore, as illustrated by FIG. 2, there may be a circuit, C, with a number of levels. For instance, there is a description below of an application to AES and its circuits. The functions may be performed in order to evaluate the circuit.

In an example, r'>2r in the method shown in FIG. 3B. In another example, performing the homomorphic evaluation in block 350 further comprises, prior to performing the key switching transformation, decreasing a norm of the first version of the selected ciphertext, by representing every number in the selected ciphertext via a sum number d>1 of smaller digits, and where r'>r+r/d.

An additional example of a key switching transformation is described in reference to FIG. 6.

3.2 Modulus Switching in Evaluation Representation

Given an element $c \in A_{q_t}$ in evaluation (double-CRT) representation relative to modulus $q_t = \Pi_{j=0}^{t} p_j$, we want to modulus-switch to $q_{t-1}$—i.e., scale down by a factor of $p_t$; we call this operation Scale(c, $q_t$, $q_{t-1}$). It is noted that an exemplary double CRT representation is described in section 5.3 below. The output should be $c' \in A$, represented via the same double-CRT format (with respect to $p_1, \ldots p_{t-1}$), such that (a) $c' \equiv c$ (mod 2), and (b) the "rounding error term" $\tau = c' - (c/p_t)$ has a very low norm. As $p_t$ is odd, we can equivalently require that the element $\tilde{c} = p_t \cdot c'$ satisfy the following:

$\tilde{c}$ is divisible by $p_t$,
$\tilde{c} \equiv c'$ (mod 2), and
$\tilde{c} - c$ (which is equal to $p_t \cdot \tau$) has low norm.

Rather than computing $c'$ directly, we will first compute $\tilde{c}$ and then set $c' \leftarrow \tilde{c}/p_t$. Observe that once we compute C in double-CRT format, it is easy to output also $c'$ in double-CRT format: given the evaluations for $\tilde{c}$ modulo $p_j$ (j<t), simply multiply them by $p_t^{-1}$ mod $p_j$. The algorithm to output $\tilde{c}$ in double-CRT format is as follows:

1. Set $\bar{c}$ to be the coefficient representation of c mod $p_t$. Computing this requires a single "small FFT" modulo the prime $p_t$. Recall that the polynomial (c mod $p_t$) is stored (in evaluation representation) in one row of our double-CRT representation of c, so we need to apply inverse-FFT to that row only, to get the same polynomial in coefficient representation.

2. Add or subtract $p_t$ from every odd coefficient of $\bar{c}$, so as to obtain a polynomial $\delta$ with coefficients in $(-p_t, p_t]$ such that $\delta \equiv \bar{c} \equiv c \pmod{p_t}$ and $\delta \equiv 0 \pmod 2$. (That is, all the coefficients of $\delta$ are even.) In other words, the end result should be as small as it can be in absolute value, so $p_t$ is subtracted from odd coefficients that are greater than zero, and added to odd coefficients that are less than zero.

3. Set $\tilde{c} = c - \delta$, and output it in double-CRT representation. Since we already have c in double-CRT representation, the computation of $\tilde{c}$ only involved converting the coefficient representation of d to double CRT representation of d, followed by subtraction. Hence it requires just t more "small FFTs" modulo the $p_j$'s.

As all the coefficients of $\bar{c}$ are within $p_t$ of those of c, the "rounding error term" $\tau = (\tilde{c}-c)/p_t$ has coefficients of magnitude at most one, hence it has low norm.

The procedure above uses t+1 small FFTs in total. This should be compared to the naive method of just converting everything to coefficient representation modulo the primes (t+1 FFTs), CRT-interpolating the coefficients, dividing and rounding appropriately the large integers (of size $\approx q_t$), CRT-decomposing the coefficients, and then converting back to evaluation representation (t+1 more FFTs). The above approach makes explicit use of the fact that we are working in a plaintext space modulo 2; in Section 8 we present a technique which works when the plaintext space is defined modulo a larger modulus.

3.3 Dynamic Noise Management

As described in the literature, BGV-type cryptosystems tacitly assume that each homomorphic operation is followed a modulus switch to reduce the noise magnitude. In an exemplary implementation, however, we attach to each ciphertext an estimate of the noise magnitude in that ciphertext, and use these estimates to decide dynamically when a modulus switch must be performed.

Each modulus switch consumes a level, and hence a goal is to reduce, over a computation, the number of levels consumed. By paying particular attention to the parameters of the scheme, and by carefully analyzing how various operations affect the noise, we are able to control the noise much more carefully than in prior work. In particular, we note that modulus-switching is really only necessary just prior to multiplication (when the noise magnitude is about to get squared), in other times it is acceptable to keep the ciphertexts at a higher level (with higher noise).

Figure 4:
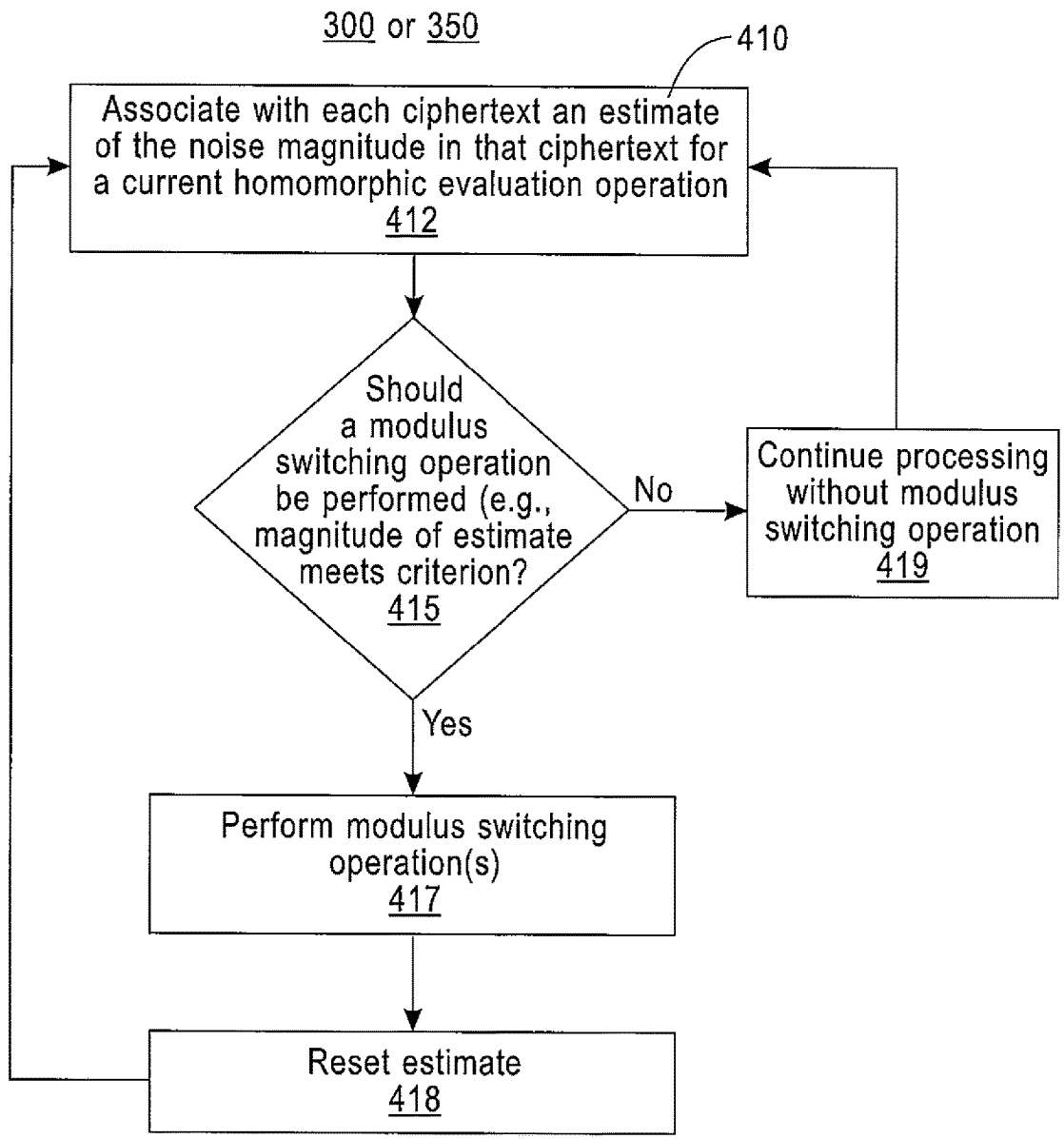

FIG. 4 is a flow diagram illustrating an example of operations that could be performed in block 300 of FIG. 3A or block 350 of FIG. 3B for dynamic noise management. The flow in FIG. 4 may be performed by the system 100 (see FIG. 1), e.g., by the one or more processors 104 and/or circuitry 102, e.g., in response to execution of the code 112 in program logic 110. The system 100 may be the search engine server 2, in an exemplary embodiment. In block 412, the system 100 associates with each ciphertext an estimate 410 of the noise magnitude in that ciphertext. Exemplary formulas for the noise evolution may include but are not limited to the following. In all cases the noise estimate before the operation is v and the noise after the operation is v'.

1) Modulus-switching: $v' = v(q_t/q_{t-1}) + B_{scale}$ where $B_{scale} \approx \sqrt{\phi(m) \cdot h}$ (e.g., see also Equation (3) below), and h is the number of nonzero coefficients in the secret key.

2) Key-switching: $v' = p \cdot v + B_{ks}$ where $B_{ks} \approx 9\phi(m) \cdot q_t$ (e.g., see also Equation (5) below), where $\sigma^2$ is the variance that is used when generating error polynomials.

3) Multiply-by-constant: $v' = |k| \cdot v$, where $|k| \approx \phi(m)/2$ is the magnitude of the constant.

4) Multiply: $v' = v_1 \cdot v_2 \cdot \sqrt{\phi(m)}$.

5) Add: $v' = v_1 + v_2$.

6) Automorphism: $v' = v$.

In block 415, the system 100 determines whether a modulus switching operation should be performed. For instance, a magnitude of estimate 410 meets a criterion (e.g., is greater than a threshold). In response to a determination a modulus switching operation is to be performed (block 415=Yes), then a modulus switching operation is performed in block 417, e.g., via the techniques presented in one of Sections 2.2 or 3.2. In block 418, the system 100 resets the estimate 410, e.g., to some default "base estimate" $B_{scale}$. The flow proceeds to block 412. In response to a determination a modulus switch is not to be performed (block 415=No), additional homomorphic evaluation processing is performed in block 419. Flow proceeds to block 412 so that the associated estimate 410 can be modified (if necessary) for other homomorphic evaluation operations. In these examples, the current estimate includes estimates of a number of previous homomorphic evaluation operations, including the current operation.

3.4 Randomized Multiplication by Constants

An exemplary implementation of the AES round function uses just a few multiplication operations (only seven per byte), but it requires a relatively large number of multiplications of encrypted bytes by constants. Hence it becomes important to try and squeeze down the increase in noise when multiplying by a constant. To that end, we encode a constant polynomial in $A_2$ as a polynomial with coefficients in $\{-1,0,1\}$, rather than in $\{0,1\}$. Namely, we have a procedure Randomize ($\alpha$) that takes a polynomial $\alpha \in A_2$ and replaces each non-zero coefficients with a coefficient chosen uniformly from $\{-1,1\}$. By Chernoff bound, we expect that for α with h nonzero coefficients, the canonical embedding norm of Randomize (α) to be bounded by $O(\sqrt{h})$ with high probability (assuming that h is large enough for the bound to kick in). This yields a better bound on the noise increase than the trivial bound of h that we would get if we just multiply by α itself. (In Section 5.5, we present a heuristic argument that we use to bound the noise, which yields the same asymptotic bounds but slightly better constants.)

4 Homomorphic Evaluation of AES

Next we describe our homomorphic implementation of AES-128. We implemented three distinct implementation possibilities; we first describe the "packed implementation", in which the entire AES state is packed in just one ciphertext. Two other implementations (of byte-slice and bit-slice AES) are described later in Section 4.2. The "packed" implementation uses the least amount of memory (which turns out to be the main constraint in our implementation), and also the fastest running time for a single evaluation. The other implementation choices allow more SIMD parallelism, on the other hand, so they can give better amortized running time when evaluating AES on many blocks in parallel.

A Brief Overview of AES

The AES-128 cipher consists often applications of the same keyed round function (with different round keys). The round function operates on a 4×4 matrix of bytes, which are sometimes considered as element of $\mathbb{F}_{2^8}$. The basic operations that are performed during the round function are AddKey, SubBytes, ShiftRows, MixColunms. The AddKey is simply an XOR operation of the current state with 16 bytes of key; the SubByte operation consists of an inversion in the field $\mathbb{F}_{2^8}$ followed by a fixed $\mathbb{F}_2$-linear map on the bits of the element (relative to a fixed polynomial representation of $\mathbb{F}_{2^8}$); the ShiftRows rotates the entries in the row i of the 4×4 matrix by i−1 places to the left; finally the MixColunms operations pre-multiplies the state matrix by a fixed 4×4 matrix.

An Exemplary Packed Representation of the AES State

For our implementation we chose the native plaintext space of our homomorphic encryption so as to support operations on the finite field $\mathbb{F}_{2^8}$. To this end we choose our ring polynomial as $\Phi_m(X)$ that factors modulo 2 into degree-d irreducible polynomials such that 8|d. (In other words, the smallest integer d such that $m|(2^d-1)$ is divisible by 8.) This means that our plaintext slots can hold elements of $\mathbb{F}_{2^d}$, and in particular we can use them to hold elements of $\mathbb{F}_{2^8}$ which is a sub-field of $\mathbb{F}_{2^d}$. Since we have $l=\phi(m)/d$ plaintext slots in each ciphertext, we can represent up to $\lfloor 1/16 \rfloor$ complete AES state matrices per ciphertext.

Moreover, we choose our parameter m so that there exists an element $g \in \mathbb{Z}^*_m$ that has order 16 in both $\mathbb{Z}^*_m$ and the quotient group $\mathbb{Z}^*_m/\langle 2 \rangle$. This condition means that if we put 16 plaintext bytes in slots $t, tg, tg^2, tg^3, \ldots$ (for some $t \in \mathbb{Z}^*_m$), then the conjugation operation $X \mapsto X^g$ implements a cyclic right shift over these sixteen plaintext bytes.

In the computation of the AES round function we use several constants. Some constants are used in the S-box lookup phase to implement the AES bit-affine transformation, these are denoted γ and $\gamma_{2^j}$ for $j=0, \ldots, 7$. In the row-shift/col-mix part we use a constant $C_{slot}$ that has 1 in slots corresponding to $t \cdot g^i$ for $i=0,4,8,12$, and 0 in all the other slots of the form $t \cdot g^i$. (Here slot t is where we put the first AES byte.) We also use 'X' to denote the constant that has the element X in all the slots.

4.1 Homomorphic Evaluation of the Basic Operations

We now examine each AES operation in turn, and describe how it is implemented homomorphically. For each operation we denote the plaintext polynomial underlying a given input ciphertext c by a, and the corresponding content of the l plaintext slots are denoted as an l-vector $(\alpha_i)_{i=1}^l$, with each $\alpha_i \in \mathbb{F}_{2^8}$.

4.1.1 AddKey and SubBytes

The AddKey is just a simple addition of ciphertexts, which yields a 4×4 matrix of bytes in the input to the SubBytes operation. We place these 16 bytes in plaintext slots $tg^i$ for $i=0,1, \ldots, 15$, using column-ordering to decide which byte goes in what slot, namely we have $a \approx [\alpha_{00} \alpha_{10} \alpha_{20} \alpha_{30} \alpha_{01} \alpha_{11} \alpha_{21} \alpha_{31} \alpha_{02} \alpha_{12} \alpha_{22} \alpha_{32} \alpha_{03} \alpha_{13} \alpha_{23} \alpha_{33}]$, encrypting the input plaintext matrix $$A = (\alpha_{ij})_{i,j} = \begin{pmatrix} \alpha_{00} & \alpha_{01} & \alpha_{02} & \alpha_{03} \\ \alpha_{10} & \alpha_{11} & \alpha_{12} & \alpha_{13} \\ \alpha_{20} & \alpha_{21} & \alpha_{22} & \alpha_{23} \\ \alpha_{30} & \alpha_{31} & \alpha_{32} & \alpha_{33} \end{pmatrix}.$$

During S-box lookup, each plaintext byte $\alpha_{ij}$ should be replaced by $\beta_{ij}=S(\alpha_{ij})$, where $S(\bullet)$ is a fixed permutation on the bytes. Specifically, S(x) is obtained by first computing $y=x^{-1}$ in $\mathbb{F}_{2^8}$ (with 0 mapped to 0), then applying a bitwise affine transformation $z=T(y)$ where elements in $\mathbb{F}_{2^8}$ are treated as bit strings with representation polynomial $G(X)=x^8+x^4+x^3+x+1$.

We implement $\mathbb{F}_{2^8}$ inversion followed by the $\mathbb{F}_2$ affine transformation using the Frobenius automorphisms, $X \to X^{2^j}$. Recall that for a power of two $k=2^j$, the transformation $\kappa_k(a(X))=(a(X^k) \mod \Phi_m(X))$ is applied separately to each slot, hence we can use it to transform the vector $(\alpha_i)_{i=1}^l$, into $(\alpha_i^k)_{i=1}^l$. We note that applying the Frobenius automorphisms to ciphertexts has almost no influence on the noise magnitude, and hence it does not consume any levels. It does increase the noise magnitude somewhat, because we need to do key switching after these automorphisms. But this is only a small influence, and we will ignore it here.

Inversion over $\mathbb{F}_{2^8}$ is done using essentially the same procedure as Algorithm 2 from [25] for computing $\beta=\alpha^{-1}=\alpha^{254}$. This procedure takes only three Frobenius automorphisms and four multiplications, arranged in a depth-3 circuit (see details below.) To apply the AES $\mathbb{F}_2$ affine transformation, we use the fact that any $\mathbb{F}_2$ affine transformation can be computed as a $\mathbb{F}_{2^8}$ affine transformation over the conjugates. Thus there are constants $\gamma_0, \gamma_1, \ldots \gamma_7, \delta \in \mathbb{F}_{2^8}$ such that the AES affine transformation $T_{AES}(\bullet)$ can be expressed as $T_{AES}(\beta)=\delta+\sum_{j=0}^{7}\gamma_j \cdot \beta^{2^j}$ over $\mathbb{F}_{2^8}$. We therefore again apply the Frobenius automorphisms to compute eight ciphertexts encrypting the polynomials $\kappa_k(b)$ for $k=1, 2, 4, \ldots, 128$, and take the appropriate linear combination (with coefficients the $\gamma_j$'s) to get an encryption of the vector $(T_{AES}(\alpha_i^{-1}))_{i=1}^l$. For our parameters, a multiplication-by-constant operation consumes roughly half a level in terms of added noise.

One subtle implementation detail to note here, is that although our plaintext slots all hold elements of the same field $\mathbb{F}_{2^8}$, they hold these elements with respect to different polynomial encodings. The AES affine transformation, on the other hand, is defined with respect to one particular fixed polynomial encoding. This means that we must implement in the i'th slot not the affine transformation $T_{AES}(\bullet)$ itself but rather the projection of this transformation onto the appropriate polynomial encoding: When we take the affine transformation of the eight ciphertexts encrypting $b_j=\kappa_{2^j}(b)$, we therefore multiply the encryption of $b_j$ not by a constant that has $\gamma_j$ in all the slots, but rather by a constant that has in slot i the projection of $\gamma_j$ to the polynomial encoding of slot i.

The table below illustrates a pseudo-code description of an exemplary S-box lookup implementation, together with an approximation of the levels that are consumed by these operations. (These approximations are somewhat underestimates, however.)

| | Level | |
|---|---|---|
| Input: ciphertext c | t | |
| // Compute $c_{254} = c^{-1}$ | | |
| 1. $c_2 \leftarrow c \gg 2$ | t | // Frobenius $X \mapsto X^2$ |
| 2. $c_3 \leftarrow c \times c_2$ | t + 1 | // Multiplication |
| 3. $c_{12} \leftarrow c_3 \gg 4$ | t + 1 | // Frobenius $X \mapsto X^4$ |
| 4. $c_{14} \leftarrow c_{12} \times c_2$ | t + 2 | // Multiplication |
| 5. $c_{15} \leftarrow c_{12} \times c_3$ | t + 2 | // Multiplication |
| 6. $c_{240} \leftarrow c_{15} \gg 16$ | t + 2 | // Frobenius $X \mapsto X^{16}$ |
| 7. $c_{254} \leftarrow c_{240} \times c_{14}$ | t + 3 | // Multiplication |
| // Affine transformation over $\mathbb{F}_2$ | | |
| 8. $c_{2^j}' \leftarrow c_{254} \gg 2^j$ for j = 0, 1, 2, ..., 7 | t + 3 | // Frobenius $X \mapsto X^{2^j}$ |
| 9. $c'' \leftarrow \gamma + \Sigma_{j=0}^{7} \gamma j \times c_{2^j}'$ | t + 3.5 | // Linear combination over $\mathbb{F}_2$s |

4.1.2 ShiftRows and MixColumns

As commonly done, we interleave the ShiftRows/MixColumns operations, viewing both as a single linear transformation over vectors from $(\mathbb{F}_{2^8})^{16}$. As mentioned above, by a careful choice of the parameter m and the placement of the AES state bytes in our plaintext slots, we can implement a rotation-by-i of the rows of the AES matrix as a single automorphism operations $X \mapsto X^{g^j}$ (for some element g ∈ $\mathbb{Z}/m\mathbb{Z}^*$). Given the ciphertext c″ after the SubBytes step, we use these operations (in conjunction with 1-SELECT operations, as described in [15]) to compute four ciphertexts corresponding to the appropriate permutations of the 16 bytes (in each of the l/16 different input blocks). These four ciphertexts are combined via a linear operation (with coefficients 1,X, and (1+X)) to obtain the final result of this round function. The table below shows a pseudo-code of this implementation and an approximation for the levels that it consumes (starting from t—3.5). We note that the permutations are implemented using automorphisms and multiplication by constant, thus we expect them to consume roughly ½ level.

| | Level | |
|---|---|---|
| Input: ciphertext c″ | t + 3.5 | |
| 10. $c_j^* \leftarrow \pi j(c'')$ for j = 1,2,3,4 | t + 4.0 | // Permutations |
| 11. Output $X \cdot c_1^* + (X + 1) \cdot c_2^* + c_3^* + c_4^*$ | t + 4.5 | // Linear combination |

4.1.3 The Cost of One Round Function

The above description yields an estimate of 5 levels for implementing one round function. This is however, an underestimate. The actual number of levels depends on details such as how sparse the scalars are with respect to the embedding via $\Phi_m$ in a given parameter set, as well as the accumulation of noise with respect to additions, Frobenius operations etc. Running over many different parameter sets we find the average number of levels per round for this method varies between 5.0 and 6.0.

We mention that the byte-slice and bit-slice implementations, given in Section 4.2 below, can consume fewer levels per round function, since these implementations do not need to permute slots inside a single ciphertext. Specifically, for our byte-sliced implementation, we only need 4.5-5.0 levels per round on average. However, since we need to manipulate many more ciphertexts, the implementation takes much more time per evaluation and requires much more memory. On the other hand it offers wider parallelism, so yields better amortized time per block. Our bit-sliced implementation should theoretical consume the least number of levels (by purely counting multiplication gates), but the noise introduced by additions means the average number of levels consumed per round varies from 5.0 up to 10.0.

4.2 Byte- and Bit-Slice Implementations

In the byte sliced implementation we use sixteen distinct ciphertexts to represent a single state matrix. (But since each ciphertext can hold l plaintext slots, then these 16 ciphertexts can hold the state of t different AES blocks). In this representation there is no interaction between the slots, thus we operate with pure l-fold SIMD operations. The AddKey and SubBytes steps are exactly as above (except applied to 16 ciphertexts rather than a single one). The permutations in the ShiftRows/MixColumns step are now "for free", but the scalar multiplication in MixColumns still consumes another level in the modulus chain.

Using the same estimates as above, we expect the number of levels per round to be roughly four (as opposed to the 4.5 of the packed implementation). In practice, again over many parameter sets, we find the average number of levels consumed per round is between 4.5 and 5.0.

For the bit sliced implementation we represent the entire round function as a binary circuit, and we use 128 distinct ciphertexts (one per bit of the state matrix). However each set of 128 ciphertexts is able to represent a total of l distinct blocks. The main issue here is how to create a circuit for the round function which is as shallow, in terms of number of multiplication gates, as possible. Again the main issue is the SubBytes operation as all operations are essentially linear. To implement the SubBytes we used the "depth-16" circuit of Boyar and Peralta [3], which consumes four levels. The rest of the round function can be represented as a set of bit-additions, Thus, implementing this method means that we consumes a minimum of four levels on computing an entire round function. However, the extensive additions within the Boyar-Peralta circuit mean that we actually end up consuming a lot more. On average this translates into actually consuming between 5.0 and 10.0 levels per round.

4.3 Performance Details

As remarked in the introduction, we implemented the above variant of evaluating AES homomorphically on a very large memory machine; namely a machine with 256 GB of RAM. Firstly parameters were selected, as in Section 7, to cope with 60 levels of computation, and a public/private key pair was generated; along with the key-switching data for multiplication operations and conjugation with-respect-to the Galois group.

As input to the actual computation was an AES plaintext block and the eleven round keys; each of which was encrypted using our homomorphic encryption scheme. Thus the input consisted of eleven packed ciphertexts. Producing the encrypted key schedule took around half an hour. To evaluate the entire ten rounds of AES took just over 36 hours; however each of our ciphertexts could hold 864 plaintext slots of elements in $\mathbb{F}_{2^8}$, thus we could have processed 54 such AES blocks in this time period. This would result in a throughput of around forty minutes per AES block.

We note that as the algorithm progressed the operations became faster. The first round of the AES function took 7 hours, whereas the penultimate round took 2 hours and the last round took 30 minutes. Recall, the last AES round is somewhat simpler as it does not involve a MixColumns operation.

Whilst our other two implementation choices (given in Section 4.2 below) may seem to yield better amortized per-block timing, the increase in memory requirements and data actually makes them less attractive when encrypting a single block. For example just encrypting the key schedule in the Byte-Sliced variant takes just under 5 hours (with 50 levels), with an entire encryption taking 65 hours (12 hours for the first round, with between 4 and 5 hours for both the penultimate and final rounds). This however equates to an amortized time of just over five minutes per block.

The Bit-Sliced variant requires over 150 hours to just encrypt the key schedule (with 60 levels), and evaluating a single round takes so long that our program is timed out before even a single round is evaluated.

5 More Details

Following [22, 5, 15, 27] we utilize rings defined by cyclotomic polynomial, $A=Z[X]/\Phi_m(X)$. We let $A_q$ denote the set of elements of this ring reduced modulo various (possibly composite) moduli q. The ring A is the ring of integers of the m-th cyclotomic number field K.

5.1 Plaintext Slots

In an exemplary scheme, plaintexts will be elements of $A_2$, and the polynomial $\Phi_m(X)$ factors modulo 2 into 1 irreducible factors, $\Phi_m(X)=F_1(X)\cdot F_2(X) \ldots F_l(X) (\bmod\ 2)$, all of degree $d=\phi(m)/l$. Just as in [5, 15, 27] each factor corresponds to a "plaintext slot". That is, we view a polynomial $a \in \mathbb{A}_2$ as representing an l-vector (a mod $F_i)_{i=1}^l$.

It is standard fact that the Galois group $\text{Gal}=\text{Gal}(Q(\zeta_m)/Q)$ consists of the mappings $\kappa_k:a(X)\mapsto(x^k) \bmod \Phi_m(X)$ for all k co-prime with m, and that it is isomorphic to $(Z/mZ)^*$. As noted in [15], for each $i,j \in \{1,2,\ldots,1\}$ there is an element $\kappa_k \in \text{Gal}$ which sends an element in slot i to an element in slot j. Namely, if $b=\kappa_k(a)$ then the element in the j'th slot of b is the same as that in the i'th slot of a. In addition Gal contains the Frobenius elements, $X\mapsto X^{2^j}$, which also act as Frobenius on the individual slots separately.

For the purpose of implementing AES we will be specifically interested in arithmetic in $F_{2^8}$ (represented as $F_{2^8}=F_2[X]/G(X)$ with $G(X)=X^8+X^4+X^3+X+1$). We choose the parameters so that d is divisible by 8, so $F_{2^d}$ includes $F_{2^8}$ as a subfield. This lets us think of the plaintext space as containing l-vectors over $F_{2^8}$.

5.2 Canonical Embedding Norm

Following [22], we use as the "size" of a polynomial $a \in A$ the $l_\infty$ norm of its canonical embedding. Recall that the canonical embedding of $a \in A$ into $\mathbb{C}^{\phi(m)}$ is the $\phi(m)$-vector of complex numbers $\sigma(a)=(a(\zeta_m^i))_i$ where $\zeta_m$ is a complex primitive m-th root of unity and the indexes i range over all of $(Z/mZ)^*$. We call the norm of $\sigma(a)$ the canonical embedding norm of a, and denote it by $$\|a\|_\infty^{can}=\|\sigma(a)\|_\infty.$$

We will make use of the following properties of $\|\cdot\|_\infty^{can}$:
For all $a,b \in A$ we have $\|a \cdot b\|_\infty^{can} \leq \|a\|_\infty^{can} \cdot \|b\|_\infty^{can}$.
For all $a \in A$ we have $\|a\|_\infty^{can} \leq \|a\|_1$.
There is a ring constant $c_m$ (depending only on m) such that $\|a\|_\infty \leq c_m \cdot \|a\|_\infty^{can}$ for all $a \in A$.

The ring constant $c_m$ is defined by $c_m=\|CRT_m^{-1}\|_\infty$ where $CRT_m$ is the CRT matrix for m, i.e. the Vandermonde matrix over the complex primitive m-th roots of unity. Asymptotically the value $c_m$ can grow super-polynomially with m, but for the "small" values of m one would use in practice values of $c_m$ can be evaluated directly. See [11] for a discussion of $c_m$.

Canonical Reduction

When working with elements in $A_q$ for some integer modulus q, we sometimes need a version of the canonical embedding norm that plays nice with reduction modulo q. Following [15], we define the canonical embedding norm reduced modulo q of an element $a \in A$ as the smallest canonical embedding norm of any a' which is congruent to a modulo q. We denote it as $$|a|_q^{can} \stackrel{def}{=} \min\{\|a'\|_\infty^{can}:a' \in \mathbb{A}, a' \equiv a (\bmod\ q)\}.$$

We sometimes also denote the polynomial where the minimum is obtained by $[a]_q^{can}$, and call it the canonical reduction of a modulo q. Neither the canonical embedding norm nor the canonical reduction is used in the scheme itself, it is only in the analysis of it that we will need them. We note that (trivially) we have $|a|_q^{can} \leq \|a\|_\infty^{can}$.

5.3 Double CRT Representation

As noted in Section 2, we usually represent an element $a \in A_q$ via double-CRT representation, with respect to both the polynomial factor of $\Phi_m(X)$ and the integer factors of q. Specifically, we assume that Z/qZ contains a primitive m-th root of unity (call it $\zeta$), so $\Phi_m(X)$ factors modulo q to linear terms $\Phi_m(X)=\Pi_{i \in (Z/mZ)} \cdot (X-\zeta^i) (\bmod\ q)$. We also denote q's prime factorization by $q=\Pi_{i=0}^t p_i$. Then a polynomial $a \in A_q$ is represented as the $(t+1) \times \phi(m)$ matrix of its evaluation at the roots of $\Phi_m(X)$ modulo $p_i$ for $i=0, \ldots, t$:

$$\text{dble-}CRT^t(a)=(a(\zeta^j) \bmod p_i)_{0 \leq i \leq t, j \in (Z/mZ)^*}.$$

The double CRT representation can be computed using t+1 invocations of the FFT algorithm modulo the $p_i$'s, picking only the FFT coefficients which correspond to elements in $(Z/mZ)^*$. To invert this representation we invoke the inverse FFT algorithm t+1 times on a vector of length m consisting of the thinned out values padded with zeros, then apply the Chinese Remainder Theorem, and then reduce modulo $\Phi_m(X)$ and q.

Addition and multiplication in $\mathbb{A}_q$ can be computed as component-wise addition and multiplication of the entries in the two tables as follows (modulo the appropriate primes $p_i$), $$\text{dble-}CRT^t(a+b)=\text{dble-}CRT^t(a)+\text{dble-}CRT^t(b),$$

$$\text{dble-}CRT^t(a \cdot b)=\text{dble-}CRT^t(a) \cdot \text{dble-}CRT^t(b).$$

Also, for an element of the Galois group $\kappa_k \in \mathcal{G}al$ (which maps $a(X) \in \mathbb{A}$ to $a(X^k) \bmod \Phi_m(X)$), we can evaluate $\kappa_k(a)$ on the double-CRT representation of a just by permuting the columns in the matrix, sending each column j to column $j \cdot k$ mod m.

Turning to FIG. 10, a logic flow diagram is shown that illustrates the operation of an exemplary method, a result of execution of computer program instructions embodied on a computer readable memory, and/or functions performed by logic implemented in hardware, in accordance with exemplary embodiments of this invention. The operations in FIG. 10 are described herein, e.g., in reference to the instant section (Section 5.3) and to Section 3.2 above. The flow in FIG. 10 may be performed by the system 100 (see FIG. 1), e.g., by the one or more processors 104 and/or circuitry 102, e.g., in response to execution of the code 112 in program logic 110. The system 100 may be the search engine server 2, in an exemplary embodiment. In block 1010, the system 100 performs the operation of performing a homomorphic evaluation of a function on one or more input ciphertexts. The one or more input ciphertexts were encrypted using an encryption scheme that includes a plurality of integer moduli, where each ciphertext contains one or more elements of an m-th cyclotomic number field, where m is an integer. Each ciphertext which is defined relative to one of the moduli q, each element a(X) of the m-th cyclotomic number field is represented via a matrix, with each row i of the matrix corresponding to an integer factor $p_i$ of the modulus q and each column j corresponding to a polynomial factor $F_j(X)$ of the m-th cyclotomic polynomial $\Phi_m(X)$ modulo q, and where content of the matrix in row i and column j corresponds to the element a(X) modulo $p_i$ and $F_j(X)$. Performing the homomorphic evaluation of the function further comprises performing one or more operations using one or more matrices from one or more of the ciphertexts. See block 1010. In block 1020, the system 100 performs the operation of outputting one or more results of the one or more operations. Such output could be to a memory and/or a network.

The method of FIG. 10 may include where the one or more operations comprise homomorphic multiplication operations of two ciphertexts performed by entry-by-entry multiplication of matrices from the two ciphertexts. The method of FIG. 10 may also include where the one or more operations comprise automorphism of a ciphertext performed by permuting columns of the matrices from the ciphertext.

The method of FIG. 10 may further include where the plurality of moduli consist of products of smaller primes $p_1$, where the t-th modulus $q_t$ is the product of the first t smaller primes, $q_t=\Pi_{i=1}^{t}p_i$ (where "smaller" in this context means smaller than q). Furthermore, each small prime $p_i$, $p_i-1$ may be divisible by m, where m is an integer defining the m-th cyclotomic number field. Additionally, the one or more operations from block 1010 may comprise performing a modulus switching operation from $q_t$ to $q_{t-1}$ on a ciphertext. Performing the modulus switching operation may comprise scaling down each element a(X) of the m'th cyclotomic number field in the ciphertext by a factor of $p_t=q_t/q_{t-1}$, where the operation of scaling comprises:

setting $\bar{a}(X)$ to be a coefficient representation of a(X) mod $p_t$;

performing one of adding or subtracting $p_t$ from every odd coefficient of $\bar{a}(X)$, thereby obtaining a polynomial $\delta(X)$ with coefficients in $(-p_t, p_t]$;

computing the representation the polynomial $\delta(X)$ by a matrix of elements $\delta_{ij}(X)$, where the element in row i and column j of the matrix is computed as $\delta(X)$ modulo the i'th small prime $p_i$ and the j'th polynomial factor $F_j(X)$ of the cyclotomic polynomial $\Phi_m(X)$ modulo $p_i$, $\delta_{ij}(X)=\delta(X)$ mod $(p_i, F_j(X))$;

subtracting $\delta(X)$ from a(X), setting $\tilde{a}(X)=a(X)-\delta(X)$; and dividing $\tilde{a}(X)$ by $p_t$, setting $a'(X)=\tilde{a}(X)/p_t$, and outputting $a'(X)$.

As stated above, the method of FIG. 10 may further include where the plurality of moduli consist of products of small primes $p_i$. Additionally, the one or more operations from block 1010 may comprise where the one or more operations comprise performing a modulus switching operation from $q_t$ to $q_{t-1}$ on a ciphertext, and where performing the modulus switching operation comprises scaling down each element a(X) of the m-th cyclotomic number field in the ciphertext by a factor of $p_t=q_t/q_{t-1}$, where the operation of scaling comprises:

setting $\bar{a}(X)$ to be a coefficient representation of a(X) mod $p_t$;

adding or subtracting multiplies of $p_t$ to every coefficient of $\bar{a}(X)$, thereby obtaining a polynomial $\delta(X)$ where all the coefficients of $\delta(X)$ are divisible by an integer r, where r is co-prime with $p_t$;

computing the representation the polynomial $\delta(X)$ by a matrix of elements $\delta_{ij}(X)$, where the element in row i and column j of the matrix is computed as $\delta(X)$ modulo the i'th small prime $p_i$ and the j'th polynomial factor $F_j(X)$ of the cyclotomic polynomial $\Phi_m(X)$ modulo $p_i$, $\delta_{ij}(X)=\delta(X)$ mod $(p_i, F_j(X))$;

subtracting $\delta(X)$ from a(X), setting $\tilde{a}(X)=a(X)-\delta(X)$; and dividing $\tilde{a}(X)$ by $p_t$, setting $a'(X)=\tilde{a}(X)/p_t$, and outputting $a'(X)$.

5.4 Sampling From $\mathbb{A}_q$

At various points we will need to sample from $\mathbb{A}_q$ with different distributions, as described below. We denote choosing the element $a \in \mathbb{A}$ according to distribution $\mathcal{D}$ by a $a \leftarrow \mathcal{D}$. The distributions below are described as over $\phi(m)$-vectors, but we always consider them as distributions over the ring $\mathbb{A}$, by identifying a polynomial $a \in \mathbb{A}$ with its coefficient vector.

The uniform distribution $U_q$: This is just the uniform distribution over $(\mathbb{Z}/q\mathbb{Z})^{\phi(m)}$, which we identify with $(\mathbb{Z} \cap (-q/2, q/2])^{\phi(m)}$. Note that it is easy to sample from $U_q$ directly in double-CRT representation.

The "discrete Gaussian" $\mathcal{DG}_q(\sigma^2)$: Let $\mathcal{N}(0,\sigma^2)$ denote the normal (Gaussian) distribution on real numbers with zero-mean and variance $\sigma^2$, we use drawing from $\mathcal{N}(0,\sigma^2)$ and rounding to the nearest integer as an approximation to the discrete Gaussian distribution. Namely, the distribution $\mathcal{DG}_{q_1}(\sigma^2)$ draws a real $\phi$-vector according to $\mathcal{N}(0,\sigma^2)^{\phi(m)}$, rounds it to the nearest integer vector, and outputs that integer vector reduced modulo q (into the interval $(-q/2, q/2]$)

Sampling small polynomials, $\mathcal{ZO}(p)$ and $\mathcal{HWT}(h)$: These distributions produce vectors in $\{0, \pm 1\}^{\phi(m)}$.

For a real parameter $\rho \in 0,1]$, $\mathcal{ZO}(p)$ draws each entry in the vector from $\{0, \pm 1\}$, with probability $\rho/2$ for each of $-1$ and $+1$, and probability of being zero $1-\rho$.

For an integer parameter $h \leq \phi(m)$, the distribution $\mathcal{HWT}(h)$ chooses a vector uniformly at random from $\{0, \pm 1\}^{\phi(m)}$, subject to the conditions that it has exactly h nonzero entries.

5.5 Canonical Embedding Norm of Random Polynomials

In the coming sections we will need to bound the canonical embedding norm of polynomials that are produced by the distributions above, as well as products of such polynomials. In some cases it is possible to analyze the norm rigorously using Chernoff and Hoeffding bounds, but to set the parameters of our scheme we instead use a heuristic approach that yields better constants:

Let $a \in \mathbb{A}$ be a polynomial that was chosen by one of the distributions above, hence all the (nonzero) coefficients in a are IID (independently identically distributed). For a complex primitive m-th root of unity $\zeta_m$, the evaluation $a(\zeta_m)$ is the inner product between the coefficient vector of a and the fixed vector $z_m=(1, \zeta_m, \zeta_m^2, \ldots)$, which has Euclidean norm exactly $\sqrt{\phi(m)}$. Hence the random variable $a(\zeta_m)$ has variance $V=\sigma^2\phi(m)$, where $\sigma^2$ is the variance of each coefficient of a. Specifically, when $a \leftarrow U_q$ then each coefficient has variance $q^2/12$, so we get variance $V_U=q^2\phi(m)/12$. When $a \leftarrow \mathcal{DG}_q(\sigma^2)$ we get variance $V_G \approx \sigma^2\phi(m)$, and when $a \leftarrow \mathcal{ZO}(\rho)$ we get variance $V_Z=\rho\phi(m)$. When choosing $a \leftarrow \mathcal{HWT}(h)$ we get a variance of $V_H=h$ (but not $\phi(m)$, since a has only h nonzero coefficients).

Moreover, the random variable $a(\zeta_m)$ is a sum of many IID random variables, hence by the law of large numbers it is distributed similarly to a complex Gaussian random variable of the specified variance. The mean of $a(\zeta_m)$ is zero, since the coefficients of a are chosen from a zero-mean distribution. We therefore use $6\sqrt{V}$ (i.e. six standard deviations) as a high-probability bound on the size of $a(\zeta_m)$. Since the evaluation of a at all the roots of unity obeys the same bound, we use six standard deviations as our bound on the canonical embedding norm of a. (We chose six standard deviations since erfc $(6) \approx 2^{-55}$, which is good enough for us even when using the union bound and multiplying it by $\phi(m) \approx 2^{16}$.)

In many cases we need to bound the canonical embedding norm of a product of two such "random polynomials". In this case our task is to bound the magnitude of the product of two random variables, both are distributed close to Gaussians, with variances $\sigma_a^2$, $\sigma_b^2$, respectively. For this case we use $16\sigma_a\sigma_b$ as our bound, since erfc $(4) \approx 2^{-25}$, so the probability that both variables exceed their standard deviation by more than a factor of four is roughly $2^{-50}$.

6. The Basic Scheme

We now define our leveled HE scheme on L levels; including the Modulus-Switching and Key-Switching operations and the procedures for KeyGen,Enc,Dec, and for Add, Mult, Scalar-Mult, and Automorphism.

Recall that a ciphertext vector c in the cryptosystem is a valid encryption of $a \in \mathbb{A}$ with respect to secret key s and modulus q if $[[\langle c,s \rangle]_q]_2 = a$, where the inner product is over $\mathbb{A} = \mathbb{Z}[X]/\Phi_m(X)$, the operation $[\cdot]_q$ denotes modular reduction in coefficient representation into the interval $(-q/2, +q/2]$, and we require that the "noise" $[\langle c,s \rangle]_q$ is sufficiently small (in canonical embedding norm reduced mod q). In an exemplary implementation, a "normal" ciphertext is a 2-vector $c = (c_0, c_1)$, and a "normal" secret key is of the form $s = (1, -s)$, hence decryption takes the form $$a \leftarrow [c_0 - c_1 \cdot s]_q \bmod 2. \quad (2)$$

6.1 Our Moduli Chain

We define the chain of moduli for our depth-L homomorphic evaluation by choosing L "small primes" $p_0, p_1, \ldots, p_{L-1}$ and the t'th modulus in our chain is defined as $q_t = \Pi_{j=0}^t p_j$. (The sizes will be determined later.) The primes $p_i$'s are chosen so that for all i, $\mathbb{Z}/p_i\mathbb{Z}$ contains a primitive m-th root of unity. Hence we can use our double-CRT representation for all $\mathbb{A}_{q_t}$.

This choice of moduli makes it easy to get a level-(t−1) representation of $a \in \mathbb{A}$ from its level-t representation. Specifically, given the level-t double-CRT representation dble-$CRT^t(a)$ for some $a \in \mathbb{A}_{q_t}$, we can simply remove from the matrix the row corresponding to the last small prime $p_t$, thus obtaining a level-(t−1) representation of a mod $q_{t-1} \in \mathbb{A}_{q_{t-1}}$. Similarly we can get the double-CRT representation for lower levels by removing more rows. By a slight abuse of notation we write dble-$CRT^{t'}(a)$=dble-$CRT^t(a)$ mod $q_{t'}$ for $t'<t$.

Recall that encryption produces ciphertext vectors valid with respect to the largest modulus $q_{L-1}$ in our chain, and we obtain ciphertext vectors valid with respect to smaller moduli whenever we apply modulus-switching to decrease the noise magnitude. As described in Section 3.3, our implementation dynamically adjusts levels, performing modulus switching when the dynamically-computed noise estimate becomes too large. Hence each ciphertext in our scheme is tagged with both its level t (pinpointing the modulus $q_t$ relative to which this ciphertext is valid), and an estimate v on the noise magnitude in this ciphertext. In other words, a ciphertext is a triple $(c,t,v)$ with $0 \le t \le L-1$, c a vector over $\mathbb{A}_{q_t}$, and v a real number which is used as our noise estimate.

6.2 Modulus Switching

The operation SwitchModulus(c) takes the ciphertext $c=((c_0, c_1),t,v)$ defined modulo $q_t$ and produces a ciphertext $c'=((c'_0,c'_1),t-1,v')$ defined modulo $q_{t-1}$, Such that $[c_0-s \cdot c_1]_{q_t} \equiv [c'_0-s \cdot c'_1]_{q_{t-1}}$ (mod 2), and $v'$ is smaller than v. This procedure makes use of the function Scale(x,q,q') that takes an element $x \in \mathbb{A}_q$ and returns an element $y \in \mathbb{A}_{q'}$ such that in coefficient representation it holds that $y \equiv x \pmod 2$, and y is the closest element to $(q'/q) \cdot x$ that satisfies this mod-2 condition.

To maintain the noise estimate, the procedure uses the pre-set ring-constant $c_m$ (cf. Section 5.2) and also a pre-set constant $B_{scale}$ which is meant to bound the magnitude of the added noise term from this operation. It works as shown in FIG. 5.

The constant $B_{scale}$ is set as $B_{scale} = 2\sqrt{\phi(m)/3} \cdot (8\sqrt{h}+3)$, where h is the Hamming weight of the secret key. (In an exemplary embodiment, we use h=64, so we get $B_{scale} \approx 77 \sqrt{\phi(m)}$.) To justify this choice, we apply to the proof of the modulus switching lemma from [15, Lemma~13](in the full version), relative to the canonical embedding norm. In that proof it is shown that when the noise magnitude in the input ciphertext $c=(c_0,c_1)$ is bounded by v, then the noise magnitude in the output vector $c'=(c'_0, c'_1)$ is bounded by $$v' = \frac{q_{t-1}}{q_t} \cdot v + \|\langle s, \tau \rangle\|_\infty^{can},$$

provided that the last quantity is smaller than $q_{t-1}/2$.

Above $\tau$ is the "rounding error" vector, namely $$\tau \overset{def}{=} (\tau_0, \tau_1) = (c'_0, c'_1) - \frac{q_{t-1}}{q_t}(c_0, c_1).$$

Heuristically assuming that $\tau$ behaves as if its coefficients are chosen uniformly in $[-1,+1]$, the evaluation $\tau_i(\zeta)$ at an m-th root of unity $\zeta_m$ is distributed close to a Gaussian complex with variance $\phi(m)/3$. Also, s was drawn from $\mathcal{HWT}(h)$ so $s(\zeta_m)$ is distributed close to a Gaussian complex with variance h. Hence we expect $\tau_i(\zeta)s(\zeta)$ to have magnitude at most $16\sqrt{\phi(m)/3 \cdot h}$ (recall that we use h=64). We can similarly bound $\tau_0(\zeta_m)$ by $6\sqrt{\phi(m)/3}$, and therefore the evaluation of $\langle s,\tau \rangle$ at $\zeta_m$ is bounded in magnitude (whp) by:

$$16\sqrt{\phi(m)/3 \cdot h} + 6\sqrt{\phi(m)/3} = 2\sqrt{\phi(m)/3} \cdot (8\sqrt{h}+3) \approx 77\sqrt{\phi(m)} = B_{scale}. \quad (3)$$

6.3 Key Switching

After some homomorphic evaluation operations we have on our hands not a "normal" ciphertext which is valid relative to "normal" secret key, but rather an "extended ciphertext" $((d_0,d_1,d_2),q_t,v)$ which is valid with respect to an "extended secret key" $s'=(1,-s,-s')$. Namely, this ciphertext encrypts the plaintext $a \in \mathbb{A}$ via $$a = [[d_0 - s \cdot d_1 - s' \cdot d_2]_{q_t}]_2,$$

and the magnitude of the noise $[d_0 - s \cdot d_1 - d_2 \cdot s']_{q_t}$ is bounded by v. In our implementation, the component s is always the same element $s \in \mathbb{A}$ that was drawn from $\mathcal{HWT}(h)$ during key generation, but s' can vary depending on the operation. (See the description of multiplication and automorphisms below.)

To enable that translation, we use some "key switching matrices" that are included in the public key. (In an exemplary implementation these "matrices" have dimension 2×1, i.e., they consist of only two elements from $\mathbb{A}$.) As explained in Section 3.1, we save on space and time by artificially "boosting" the modulus we use from $q_t$ up to $P \cdot q_t$ for some "large" modulus P. We note that in order to represent elements in $\mathbb{A}_{Pq_t}$ using our dble-CRT representation we need to choose P so that $\mathbb{Z}/P\mathbb{Z}$ also has primitive m-th roots of unity. (In fact in one implementation we pick P to be a prime.)

The Key-Switching "Matrix".

Denote by $Q = P \cdot q_{L-2}$ the largest modulus relative to which we need to generate key-switching matrices. To generate the key-switching matrix from $s' = (1, -s, -s')$ to $s = (1, -s)$ (note that both keys share the same element s), we choose two element, one uniform and the other from our "discrete Gaussian"

$$a_{s,s'} \leftarrow U_Q \text{ and } e_{s,s'} \leftarrow \mathcal{DG}_Q(\sigma^2),$$

where the variance $\sigma$ is a global parameter (that we later set as $\sigma=3.2$). The "key switching matrix" then consists of the single column vector $$W[s' \to s] = \begin{pmatrix} b_{s,s'} \\ a_{s,s'} \end{pmatrix}, \text{ where } b_{s,s'} \stackrel{def}{=} [s \cdot a_{s,s'} + 2e_{s,s'} + Ps']_Q. \quad (4)$$

Note that W above is defined modulo $Q=Pq_{L-2}$, but we need to use it relative to $Q_t=Pq_t$ for whatever the current level t is. Hence before applying the key switching procedure at level t, we reduce W modulo $Q_t$ to get $$W_t \stackrel{def}{=} [W]_{Q_t}.$$

It is important to note that since $Q_t$ divides Q then $W_t$ is indeed a key-switching matrix. Namely it is of the form $(b,a)^T$ with $a \in U_{Q_t}$ and $b=[s \cdot a + 2e_{s,s'} + Ps']_{Q_t}$ (with respect to the same element $e_{s,s'} \in \mathbb{A}$ from above).

The SwitchKey Procedure

Given the extended ciphertext $c = ((d_0, d_1, d_2), t, v)$ and the key-switching matrix $W_t = (b, a)^T$, the procedure SwitchKey-$W_t(c)$ proceeds as shown in FIG. 6. For simplicity we describe the SwitchKey procedure as if it always switches back to mod-$q_t$, but in reality if the noise estimate is large enough then it can switch directly to $q_{t-1}$, instead.

To argue correctness, observe that although the "actual key switching operation" from above looks superficially different from the standard key-switching operation $c' \leftarrow W \cdot c$, it is merely an optimization that takes advantage of the fact that both vectors s' and s share the element s. Indeed, we have the equality over $\mathbb{A}_{Q_t}$:

$$c_{0'} - \mathfrak{s} \cdot c_{1'} = [(P \cdot d_0) + d_2 \cdot b_{\mathfrak{s},\mathfrak{s}'} - \mathfrak{s} \cdot ((P \cdot d_1) + d_2 \cdot a_{\mathfrak{s},\mathfrak{s}'}),$$

$$= P \cdot (d_0 - \mathfrak{s} \cdot d_1 - \mathfrak{s}' d_2) + 2 \cdot d_2 \cdot \varepsilon_{\mathfrak{s},\mathfrak{s}'},$$

so as long as both sides are smaller than $Q_t$ we have the same equality also over $\mathbb{A}$ (without the mod-$Q_t$ reduction), which means that we get $$[c_0 - s \cdot c_{1'}]_{Q_t} = [P \cdot (d_0 - s \cdot d_1 - s' d_2) + 2 \cdot d_2 \cdot \epsilon_{s,s'}]_{Q_t} \equiv [d_0 - s \cdot d_1 - s' d_2]_{Q_t} \pmod{2}.$$

To analyze the size of the added term $2d_2 \epsilon_{s,s'}$, we can assume heuristically that $d_2$ behaves like a uniform polynomial drawn from $U_{q_t}$, hence $d_2(\zeta_m)$ for a complex root of unity $\zeta_m$ is distributed close to a complex Gaussian with variance $q_t^2 \phi(m)/12$. Similarly $\epsilon_{s,s'}(\zeta_m)$ is distributed close to a complex Gaussian with variance $\sigma^2 \phi(m)$, so $2d_2(\zeta) \epsilon(\zeta)$ can be modeled as a product of two Gaussians, and we expect that with overwhelming probability it remains smaller than $$2 \cdot 16 \cdot \sqrt{q_t^2 \phi(m)/12 \cdot \sigma^2 \phi(m)} = \frac{16}{\sqrt{3}} \cdot \sigma q_t \phi(m).$$

This yields a heuristic bound $16/\sqrt{3} \cdot \sigma \phi(m) \cdot q_t = B_{Ks} \cdot q_t$ on the canonical embedding norm of the added noise term, and if the total noise magnitude does not exceed $Q_t/2c_m$ then also in coefficient representation everything remains below $Q_t/2$. Thus our constant $B_{Ks}$ is set as $$\frac{16 \sigma \phi(m)}{\sqrt{3}} \approx 9 \sigma \phi(m) = B_{Ks} \quad (5)$$

Finally, dividing by P (which is the effect of the Scale operation), we obtain the final ciphertext that we require, and the noise magnitude is divided by P (except for the added $B_{scale}$ term).

6.4 Key-Generation, Encryption, and Decryption

The procedures below depend on many parameters, h, $\sigma$, m, the primes $p_i$ and P, etc. These parameters will be determined later.

KeyGen: Given the parameters, the key generation procedure chooses a low-weight secret key and then generates an LWE instance relative to that secret key. Namely, we choose $$s \leftarrow \mathcal{HWT}(h), a \leftarrow U_{q_{L-1}}, \text{ and } e \leftarrow \mathcal{DG}_{q_{L-1}}(\sigma^2)$$

Then set the secret key as s and the public key as (a,b) where $b = [a \cdot s + 2e]_{q_{L-1}}$.

In addition, the key generation procedure adds to the public key some key-switching "matrices", as described in Section 6.3. Specifically the matrix $W[s^2 \to s]$ for use in multiplication, and some matrices $W[\kappa_i(s) \to s]$ for use in automorphisms, for $\kappa_i \in \mathcal{G}$ al whose indexes generates $(\mathbb{Z}/m\mathbb{Z})^*$ (including in particular $\kappa_2$).

$Enc_{pk}(m)$: To encrypt an element $m \in \mathbb{A}_2$, we choose one "small polynomial" (with $0, \pm 1$ coefficients) and two Gaussian polynomials (with variance $\sigma^2$), $$v \leftarrow \mathcal{ZO}(0.5) \text{ and } e_0, e_1 \leftarrow \mathcal{DG}_{q_{L-1}}(\sigma_2).$$

Then we set $c_0 = b \cdot v + 2 \cdot e_0 + m$, $c_1 = a \cdot v + 2 \cdot e_1$, and set the initial ciphertext as $c' = (c_0, c_1, L-1, B_{clean})$, where $B_{clean}$ is a parameter that we determine below.

The noise magnitude in this ciphertext ($B_{clean}$) is a little larger than what we would like, so before we start computing on the ciphertext we do one modulus-switch. That is, the encryption procedure sets $c \leftarrow SwitchModulus(c')$ and outputs c. We can deduce a value for $B_{clean}$ as follows:

$$|c_0 - \mathfrak{s} \cdot c_1|_{q_t}^{can} \leq \|c_0 - \mathfrak{s} \cdot c_1\|_{\infty}^{can} =$$

$$\|((a \cdot s + 2 \cdot e) \cdot v + 2 \cdot e_0 + m - (a \cdot v + 2 \cdot e_1) \cdot \mathfrak{s}\|_{\infty}^{can} =$$

$$\|m + 2 \cdot (e \cdot v + e_0 - e_1 \cdot \mathfrak{s})\|_{\infty}^{can} \leq$$

$$\|m\|_{\infty}^{can} + 2 \cdot (\|e \cdot v\|_{\infty}^{can} + \|e_0\|_{\infty}^{can} + \|e_1 \cdot \mathfrak{s}\|_{\infty}^{can}).$$

Using our complex Gaussian heuristic from Section 5.5, we can bound the canonical embedding norm of the randomized terms above by $$\|e \cdot v\|_\infty^{can} \leq 16\sigma\phi(m)/\sqrt{2}, \|e_0\|_\infty^{can} \leq 6\sigma$$
$$\sqrt{\phi(m)}, \|e_1 \cdot s\|_\infty^{can} \leq 16\sigma\sqrt{h \cdot \phi(m)}.$$

Also, the norm of the input message m is clearly bounded by $\phi(m)$, hence (when we substitute our parameters h=64 and $\sigma$=3.2) we get the bound $$\phi(m)+32\sigma\phi(m)/\sqrt{2}+12\sigma\sqrt{\phi(m)}+32\sigma$$
$$\sqrt{h \cdot \phi(m)} \approx 74\phi(m)+858\sqrt{\phi(m)} = B_{clean} \quad (6)$$

Our goal in the initial modulus switching from $q_{L-1}$ to $q_{L-2}$ is to reduce the noise from its initial level of $B_{clean} = \oplus(\phi(m))$ to our base-line bound of $B = \oplus(\sqrt{\phi(m)})$ which is determined in Equation (12) below.

$Dec_{pk}$ (c): Decryption of a ciphertext $(c_0, c_1, t, v)$ at level t is performed by setting $m' \leftarrow [c_0 - s \cdot c_1]_{q_t}$, then converting m' to coefficient representation and outputting m' mod 2. This procedure works when $c_m \cdot v < q_t/2$, so this procedure only applies when the constant $c_m$ for the field $\mathbb{A}$ is known and relatively small (which as we mentioned above will be true for all practical parameters). Also, we must pick the smallest prime $q_0 = p_0$ large enough, as described in Section 7.2.

6.5 Homomorphic Operations

Add(c,c'): Given two ciphertexts $c = ((c_0, c_1), t, v)$ and $c' = ((c_0', c_1'), t', v')$, representing messages $m, m' \in \mathbb{A}_2$, this algorithm forms a ciphertext $c_a = ((a_0, a_1), t_a, v_a)$ which encrypts the message $m_a = m + m'$.

If the two ciphertexts do not belong to the same level then we reduce the larger one modulo the smaller of the two moduli, thus bringing them to the same level. (This simple modular reduction works as long as the noise magnitude is smaller than the smaller of the two moduli, if this condition does not hold then we need to do modulus switching rather than simple modular reduction.) Once the two ciphertexts are at the same level (call it t''), we just add the two ciphertext vectors and two noise estimates to get $$c_a = (([c_0+c_0']_{q_{t''}}, [c_1+c_1']_{q_{t''}}), t'', v+v').$$

Mult(c,c'): Given two ciphertexts representing messages m, m' $\in \mathbb{A}_2$, this algorithm forms a ciphertext encrypts the message m·m'.

We begin by ensuring that the noise magnitude in both ciphertexts is smaller than the pre-set constant B (which is our base-line bound and is determined in Equation (12) below), performing modulus-switching as needed to ensure this condition. Then we bring both ciphertexts to the same level by reducing modulo the smaller of the two moduli (if needed). Once both ciphertexts have small noise magnitude and the same level we form the extended ciphertext (essentially performing the tensor product of the two) and apply key-switching to get back a normal ciphertext. A pseudo-code description of this multiplication procedure is shown in FIG. 7.

We stress that the only place where we force modulus switching is before the multiplication operation. In all other operations we allow the noise to grow, and it will be reduced back the first time it is input to a multiplication operation. We also note that we may need to apply modulus switching more than once before the noise is small enough.

Scalar-Mult(c,α): Given a ciphertext $c = (c_0, c_1, t, v)$ representing the message m, and an element $\alpha \in \mathbb{A}_2$ (represented as a polynomial modulo 2 with coefficients in $\{-1, 0, 1\}$), this algorithm forms a ciphertext $c_m = (a_0, a_1, t_m, v_m)$ which encrypts the message $m_m = \alpha \cdot m$. This procedure is needed in our implementation of homomorphic AES, and is of more general interest in general computation over finite fields.

The algorithm makes use of a procedure Randomize(α) which takes α and replaces each non-zero coefficients with a coefficient chosen at random from $\{-1, 1\}$. To multiply by α, we set $\beta \leftarrow$ Randomize(α) and then just multiply both $c_0$ and $c_1$ by β. Using the same argument as we used in Appendix 5.5 for the distribution $\mathcal{HWT}$ (h), here too we can bound the norm of β by $\|\beta\|_\infty^{can} \leq 6\sqrt{Wt(\alpha)}$ where Wt(α) is the number of nonzero coefficients of α. Hence we multiply the noise estimate by $6\sqrt{Wt(\alpha)}$, and output the resulting ciphertext $c_m = (c_0 \cdot \beta, c_1 \cdot \beta, t, v \cdot 6\sqrt{Wt(\alpha)})$.

Automorphism(c,κ): In the main body we explained how permutations on the plaintext slots can be realized via using elements $\kappa \in \mathcal{G}$al; we also require the application of such automorphism to implement the Frobenius maps in our AES implementation.

For each κ that we want to use, we need to include in the public key the "matrix" W[κ(s)→s]. Then, given a ciphertext $c = (c_0, c_1, t, v)$ representing the message m, the function Automorphism(c,κ) produces a ciphertext $c' = (c_0', c_1', t, v')$ which represents the message κ(m). We first set an "extended ciphertext" by setting $$d_0 = \kappa(c_0), d_1 \leftarrow 0, \text{ and } d_2 \leftarrow \kappa(c_1)$$

and then apply key switching to the extended ciphertext $((d_0, d_1, d_2), t, v)$ using the "matrix" W[κ(s)→s].

7 Security Analysis and Parameter Settings

Below we derive the concrete parameters for use in our implementation. We begin in Section 7.1 by deriving a lower-bound on the dimension N of the LWE problem underlying our key-switching matrices, as a function of the modulus and the noise variance. (This will serve as a lower-bound on $\phi(m)$ for our choice of the ring polynomial $\Phi_m(X)$.) Then in Section 7.2 we derive a lower bound on the size of the largest modulus Q in our implementation, in terms of the noise variance and the dimension N. Then in Section 7.3 we choose a value for the noise variance (as small as possible subject to some nominal security concerns), solve the somewhat circular constraints on N and Q, and set all the other parameters.

7.1 Lower-Bounding the Dimension

Below we apply to the LWE-security analysis of Lindner and Peikert [20], together with a few (arguably justifiable) assumptions, to analyze the dimension needed for different security levels. The analysis below assumes that we are given the modulus Q and noise variance $\sigma^2$ for the LWE problem (i.e., the noise is chosen from a discrete Gaussian distribution modulo Q with variance $\sigma^2$ in each coordinate). The goal is to derive a lower-bound on the dimension N required to get any given security level. The first assumption that we make, of course, is that the Lindner-Peikert analysis—which was done in the context of standard LWE—applies also for our ring-LWE case. We also make the following extra assumptions:

1) We assume that (once σ is not too tiny), the security depends on the ratio Q/σ and not on Q and σ separately. Nearly all the attacks and hardness results in the literature support this assumption, with the exception of the Arora-Ge attack [2](that works whenever σ is very small, regardless of Q).

2) The analysis in [20] devised an experimental formula for the time that it takes to get a particular quality of reduced basis (i.e., the parameter δ of Gama and Nguyen [12]), then provided another formula for the advantage that the attack can derive from a reduced basis at a given quality, and finally used a computer program to solve these formulas for some given values of N and δ. This provides some time/advantage tradeoff since obtaining a smaller value of δ (i.e., higher-quality basis) takes longer time and provides better advantage for the attacker.

For our purposes we made the assumption that the best runtime/advantage ratio is achieved in the high-advantage regime. Namely we should spend basically all the attack running time doing lattice reduction, in order to get a good enough basis that will break security with advantage (say) ½. This assumption is consistent with the results that are reported in [20].

3) Finally, we assume that to get advantage of close to ½ for an LWE instance with modulus Q and noise σ, we need to be able to reduce the basis well enough until the shortest vector is of size roughly Q/σ. Again, this is consistent with the results that are reported in [20].

Given these assumptions and the formulas from [20], we can now solve the dimension/security tradeoff analytically. Because of the first assumption we might as well simplify the equations and derive our lower bound on N for the case σ=1, where the ratio Q/σ is equal to Q. (In reality we will use σ≈4 and increase the modulus by the same 2 bits).

Following Gama-Nguyen [12], recall that a reduced basis $B=(b_1|b_2| \ldots |b_M)$ for a dimension-M, determinant-D lattice (with $\|b_1\| \leq \|b_2\| \leq \ldots \leq \|b_M\|$), has quality parameter δ if the shortest vector in that basis has norm $\|b_1\| = \delta^M \cdot D^{1/M}$. In other words, the quality of B is defined as $=\|b_1\|^{1/M} D^{1/M^2}$. The time (in seconds) that it takes to compute a reduced basis of quality δ for a random LWE instance was estimated in [20] to be at least $$\log(\text{time}) \geq 1.8/\log(\delta) - 110. \quad (7)$$

For a random Q-ary lattice of rank N, the determinant is exactly $Q^N$ whp, and therefore a quality-δ basis has $\|b_1\| = \delta^M \cdot Q^{N/M}$. By our second assumption, we should reduce the basis enough so that $\|b_1\| = Q$, so we need $Q = \delta^M \cdot Q^{M/N}$. The LWE attacker gets to choose the dimension M, and the best choice for this attack is obtained when the right-hand-side of the last equality is minimized, namely for $M = \sqrt{N \cdot \log Q / \log \delta}$. This yields the condition $$\log Q = \log(\delta^M Q^{N/M}) = M \log \delta + (N/M) \log Q = 2\sqrt{N \log Q \log \delta},$$

which we can solve for N to get $N = \log Q / 4 \log \delta$. Finally, we can use Equation (7) to express log δ as a function of log(time), thus getting $N = \log Q \cdot (\log(\text{time}) + 110)/7.2$. Recalling that in our case we used σ=1 (so Q/σ=Q), we get our lower-bound on N in terms of Q/σ. Namely, to ensure a time/advantage ratio of at least $10^k$, we need to set the rank N to be at least $$N \geq \frac{\log(Q/\sigma)(k+110)}{7.2}. \quad (8)$$

For example, the above formula says that to get 80-bit security level we need to set $N \geq \log(Q/\sigma) \cdot 26.4$, for 100-bit security level we need $N \geq \log(Q/\sigma) \cdot 29.1$, and for 128-bit security level we need $N \geq \log(Q/\sigma) \cdot 33.1$. We comment that these values are indeed consistent with the values reported in [20].

7.1.1 LWE with Sparse Key

The analysis above applies to "generic" LWE instance, but in our case we use very sparse secret keys (with only h=64 nonzero coefficients, all chosen as ±1). This brings up the question of whether one can get better attacks against LWE instances with a very sparse secret (much smaller than even the noise). We note that Goldwasser et al. proved in [16] that LWE with low-entropy secret is as hard as standard LWE with weaker parameters (for large enough moduli). Although the specific parameters from that proof do not apply to our choice of parameter, it does indicate that weak-secret LWE is not "fundamentally weaker" than standard LWE. In terms of attacks, the only attack that we could find that takes advantage of this sparse key is by applying the reduction technique of Applebaum et al. [1] to switch the key with part of the error vector, thus getting a smaller LWE error.

In a sparse-secret LWE we are given a random N-by-M matrix A (modulo Q), and also an M-vector $y = [sA+e]_Q$. Here the N-vector s is our very sparse secret, and e is the error M-vector (which is also short, but not sparse and not as short as s).

Below let $A_1$ denotes the first N columns of A, $A_2$ the next N columns, then $A_3, A_4$, etc. Similarly $e_1, e_2, \ldots$ are the corresponding parts of the error vector and $y_1, y_2, \ldots$ the corresponding parts of y. Assuming that $A_1$ is invertible (which happens with high probability), we can transform this into an LWE instance with respect to secret $e_1$, as follows:

We have $y_1 = sA_1 + e_1$, or alternatively $A_1^{-1} y_1 = s + A_1^{-1} e_1$. Also, for $i>1$ we have $y_i = sA_i + e_i$, which together with the above gives $A_i A_1^{-1} y_1 - y_i = A_i A_1^{-1} e_1 - e_i$. Hence if we denote $$B_1 \stackrel{\text{def}}{=} A_1^{-1}, \text{ and for } i>1 B_i \stackrel{\text{def}}{=} A_i A_1^{-1},$$

and similarly $z_1 = A_1^{-1} y_1$, and for $i>1 z_i \stackrel{\text{def}}{=} A_i A_1^{-1} y_i$, and then set $B \stackrel{\text{def}}{=} (B_1' | B_2' | B_3' | \ldots)$ and $z \stackrel{\text{def}}{=} (z_1 | z_2 | z_3 | \ldots)$, and also $f = (s|e_2|e_3| \ldots)$ then we get the LWE instance $$z = e'_1 B + f$$

with secret $e'_1$. The thing that makes this LWE instance potentially easier than the original one is that the first part of the error vector f is our sparse/small vector s, so the transformed instance has smaller error than the original (which means that it is easier to solve).

Trying to quantify the effect of this attack, we note that the optimal M value in the attack from Section 7.1 above is obtained at M=2N, which means that the new error vector is $f = (s|e_2)$, which has Euclidean norm smaller than $e = (e_1|e_2)$ by roughly a factor of $\sqrt{2}$ (assuming that $\|s\| \ll \|e_1\| \approx \|e_2\|$). Maybe some further improvement can be obtained by using a smaller value for M, where the shorter error may outweigh the "non optimal" value of M. However, we do not expect to get major improvement this way, so it seems that the very sparse secret should only add maybe one bit to the modulus/noise ratio.

7.2 The Modulus Size

In this section we assume that we are given the parameter $N = \phi(m)$ (for our polynomial ring modulo $\Phi_m(X)$). We also assume that we are given the noise variance $\sigma^2$, the number of levels in the modulus chain L, an additional "slackness parameter" ξ (whose purpose is explained below), and the number of nonzero coefficients in the secret key h. Our goal is to devise a lower bound on the size of the largest modulus Q used in the public key, so as to maintain the functionality of the scheme.

Controlling the Noise

Driving the analysis in this section is a bound on the noise magnitude right after modulus switching, which we denote below by B. We set our parameters so that starting from ciphertexts with noise magnitude B, we can perform one level of fan-in-two multiplications, then one level of fan-in-ξ additions, followed by key switching and modulus switching again, and get the noise magnitude back to the same B.

Recall that in the "reduced canonical embedding norm", the noise magnitude is at most multiplied by modular multiplication and added by modular addition, hence after the multiplication and addition levels the noise magnitude grows from B to as much as $\xi B^2$.

As seen in Section 6.3, performing key switching scales up the noise magnitude by a factor of P and adds another noise term of magnitude up to $B_{Ks} \cdot q_t$ (before doing modulus switching to scale the noise back down). Hence starting from noise magnitude $\xi B^2$, the noise grows to magnitude $P\xi B^2 + B_{Ks} \cdot q_t$ (relative to the modulus $Pq_t$).

Below we assume that after key-switching we do modulus switching directly to a smaller modulus.

After key-switching we can switch to the next modulus $q_{t-1}$ to decrease the noise back to our bound B. Following the analysis from Section 6.2, switching moduli from $Q_t$ to $q_{t-1}$ decreases the noise magnitude by a factor of $q_{t-1}/Q_t = 1/(P \cdot p_t)$, and then add a noise term of magnitude $B_{scale}$.

Starting from noise magnitude $P\xi B^2 + B_{Ks} \cdot q_t$ before modulus switching, the noise magnitude after modulus switching is therefore bounded whp by $$\frac{P \cdot \xi B^2 + B_{Ks} \cdot q_t}{P \cdot p_t} + B_{scale} = \frac{\xi B^2}{p_t} + \frac{B_{Ks} \cdot q_{t-1}}{P} + B_{scale}$$

Using the analysis above, our goal next is to set the parameters B,P and the $p_i$'s (as functions of N, $\sigma$, L, $\xi$ and h) so that in every level t we get $$\frac{\xi B^2}{p_t} + \frac{B_{Ks} \cdot q_{t-1}}{P} + B_{scale} \leq B.$$

Namely we need to satisfy at every level t the quadratic inequality (in B)

$$\frac{\xi}{p_t} B^2 - B + \underbrace{(\frac{B_{Ks} \cdot q_{t-1}}{P} + B_{scale})}_{\text{denote this by } R_{t-1}} \leq 0. \quad (9)$$

Observe that (assuming that all the primes $p_t$ are roughly the same size), it suffices to satisfy this inequality for the largest modulus t=L−2, since $R_{t-1}$ increases with larger t's. Noting that $R_{L-3} > B_{scale}$, we want to get this term to be as close to $B_{scale}$ as possible, which we can do by setting P large enough. Specifically, to make it as close as $R_{L-3} = (1+2^{-n}) B_{scale}$ it is sufficient to set $$P \approx 2^n \frac{B_{Ks} q_{L-3}}{B_{scale}} \approx 2^n \frac{9\sigma N q_{L-3}}{77\sqrt{N}} \approx 2^{n-3} q_{L-3} \cdot \sigma \sqrt{N}, \quad (10)$$

Below we set (say) n=8, which makes it close enough to use just $R_{L-3} \approx B_{scale}$ for the derivation below.

Clearly to satisfy Inequality (9) we must have a positive discriminant, which means $$1 - 4\frac{\xi}{p_{L-2}} R_{L-3} \geq 0, \text{ or } p_{L-2} \geq 4\xi R_{L-3}.$$

Using the value $R_{L-3} \approx B_{scale}$, this translates into setting $$p_1 \approx p_2 \approx \ldots \approx p_{L-2} \approx 4\xi \cdot B_{scale} \approx 308\xi\sqrt{N} \quad (11)$$

Finally, with the discriminant positive and all the $p_i$'s roughly the same size we can satisfy Inequality (9) by setting $$B \approx \frac{1}{2\xi/p_{L-2}} = \frac{p_{L-2}}{2\xi} \approx 2B_{scale} \approx 154\sqrt{N}. \quad (12)$$

The Smallest Modulus

After evaluating our L-level circuit, we arrive at the last modulus $q_0 = p_0$ with noise bounded by $\xi B^2$. To be able to decrypt, we need this noise to be smaller than $q_0/2c_m$, where $c_m$ is the ring constant for our polynomial ring modulo $\Phi_m(X)$. For our setting, that constant is always below 40, so a sufficient condition for being able to decrypt is to set $$q_0 = p_0 \approx 80\xi B^2 \approx 2^{20.9} \xi N \quad (13)$$

The Encryption Modulus

Recall that freshly encrypted ciphertext have noise $B_{clean}$ (as defined in Equation (6)), which is larger than our baseline bound B from above. To reduce the noise magnitude after the first modulus switching down to B, we therefore set the ratio $p_{L-1} = q_{L-1}/q_{L-2}$ so that $B_{clean}/p_{L-1} + B_{scale} \leq B$. This means that we set $$p_{L-1} = \frac{B_{clean}}{B - B_{scale}} \approx \frac{74N + 858\sqrt{N}}{77\sqrt{N}} \approx \sqrt{N} + 11 \quad (14)$$

The Largest Modulus

Having set all the parameters, we are now ready to calculate the resulting bound on the largest modulus, namely $Q_{L-2} = q_{L-2} \cdot P$. Using Equations (11), and (13), we get $$q_t = p_0 \cdot \prod_{i=1}^{t} p_i \approx (2^{20.9} \xi N) \cdot (308\xi\sqrt{N})^t = 2^{20.9} \cdot 308^t \cdot \xi^{t+1} \cdot N^{t/2+1}. \quad (15)$$

Now using Equation (10) we have $$P \approx 2^5 q_{L-3} \sigma \sqrt{N} \approx 2^{25.9} \cdot 308^{L-3} \cdot \xi^{L-2} \cdot N^{(L-3)/2+1} \cdot \sigma\sqrt{N}$$

$$\approx 2 \cdot 308^L \cdot \xi^{L-2} \sigma N^{L/2}$$

and finally $$Q_{L-2} = P \cdot q_{L-2} \approx (2 \cdot 308^L \cdot \xi^{L-2} \sigma N^{L/2}) \cdot (2^{20.9} \cdot 308^{L-2} \cdot \xi^{L-1} \cdot N^{L/2}) \quad (16)$$

$$\approx \sigma \cdot 2^{16.5L+5.4} \cdot \xi^{2L-3} \cdot N^L$$

7.3 Putting it Together

We now have in Equation (8) a lower bound on N in terms of Q, $\sigma$ and the security level k, and in Equation (16) a lower bound on Q with respect to N, $\sigma$ and several other parameters. We note that $\sigma$ is a free parameter, since it drops out when substituting Equation (16) in Equation (8). In our implementation we used $\sigma = 3.2$, which is the smallest value consistent with the analysis in [23].

For the other parameters, we set $\xi = 8$ (to get a small "wiggle room" without increasing the parameters much), and set the number of nonzero coefficients in the secret key at h=64 (which is already included in the formulas from above, and should easily defeat exhaustive-search/birthday type of attacks). Substituting these values into the equations above we get $p_0 \approx 2^{23.9} N, p_i \approx 2^{11.3} \sqrt{N}$ for $i=1,\ldots,L-2$ $P \approx 2^{11.3L-5} N^{L/2}$, and $Q_{L-2} \approx 2^{22.5L-3.6} {}_0 N^L$.

Substituting the last value of $Q_{L-2}$ into Equation (8) yields $$N > \frac{(L(\log N + 23) - 8.5)(k + 110)}{7.2} \quad (17)$$

Targeting k=80-bits of security and solving for several different depth parameters L, we get the results in the table of FIG. 8, which also lists approximate sizes for the primes $p_i$ and P.

Choosing Concrete Values

Having obtained lower-bounds on $N=\phi(m)$ and other parameters, we now need to fix precise cyclotomic fields $\mathbb{Q}(\xi_m)$ to support the algebraic operations we need. We have two situations we will be interested in for our experiments. The first corresponds to performing arithmetic on bytes in $\mathbb{F}_{2^8}$ (i.e. n=8), whereas the latter corresponds to arithmetic on bits in $\mathbb{F}_2$ (i.e. n=1). See FIG. 9. We therefore need to find an odd value of m, with $\phi(m) \approx N$ and m dividing $2^d-1$, where we require that d is divisible by n. Values of m with a small number of prime factors are preferred as they give rise to smaller values of $c_m$. We also look for parameters which maximize the number of slots l we can deal with in one go, and values for which $\phi(m)$ is close to the approximate value for N estimated above. When n=1 we always select a set of parameters for which the l value is at least as large as that obtained when n=8.

8 Scale($c, q_1, q_{t-1}$) in dble-CRT Representation

Let $q_i = \Pi_{j=0}^i p_j$, where the $p_j$'s are primes that split completely in our cyclotomic field $\mathbb{A}$. We are given a $c \in \mathbb{A}_{q_t}$ represented via double-CRT—that is, it is represented as a "matrix" of its evaluations at the primitive m-th roots of unity modulo the primes $p_0, \ldots, p_1$. We want to modulus switch to $q_{t-1}$—i.e., scale down by a factor of $p_t$. Let's recall what this means: we want to output $c' \in \mathbb{A}$, represented via double-CRT format (as its matrix of evaluations modulo the primes $p_0, \ldots, p_{t-1}$), such that
1. $c' = c \mod 2$
2. $c'$ is very close (in terms of its coefficient vector) to $c/p_t$.

Above, we explained how this could be performed in dble-CRT representation. This made explicit use of the fact that the two ciphertexts need to be equivalent modulo two. If we wished to replace two with a general prime p, then things are a bit more complicated. For completeness, although it is not required in our scheme, we present a methodology below. In this case, the conditions on $c^\dagger$ are as follows:
1. $c^\dagger = c \cdot p_t \mod p$.
2. $c^\dagger$ is very close to c.
3. $c^\dagger$ is divisible by $p_t$.

As before, we set $c' \leftarrow c^\dagger/p_t$. (Note that for p=2, we trivially have $c \cdot p_t = c \mod p$, since $p_t$ will be odd.)

This causes some complications, because we set $c^\dagger \leftarrow c+\delta$, where $\delta = -\bar{c} \mod p_t$ (as before) but now $\delta = (p_t-1) \cdot c \mod p$. To compute such a $\delta$, we need to know c mod p. Unfortunately, we don't have c mod p. One not-very-satisfying way of dealing with this problem is the following. Set $\hat{c} \leftarrow [p_t]_p \cdot c \mod q_t$. Now, if c encrypted m, then $\hat{c}$ encrypts $[p_t]_p \cdot m$, and $\hat{c}$'s noise is $[p_t]_p < p/2$ times as large. It is obviously easy to compute $\hat{c}$'s double-CRT format from c's. Now, we set $c^\dagger$ so that the following is true:

1. $c^\dagger = \hat{c} \mod p$.
2. $c^\dagger$ is very close to $\hat{c}$.
3. $c^\dagger$ is divisible by $p_t$.

This is easy to do. The algorithm to output $c^\dagger$ in double-CRT format is as follows:
1. Set $\bar{c}$ to be the coefficient representation of $\hat{c} \mod p_t$. (Computing this requires a single "small FFT" modulo the prime $p_t$.)
2. Set $\delta$ to be the polynomial with coefficients in $(-p_t \cdot p/2, p_t \cdot p/2]$ such that $\delta = 0 \mod p$ and $\delta = -\bar{c} \mod p_t$.
3. Set $c^\dagger = \hat{c} + \delta$, and output $c^\dagger$'s double-CRT representation.
   (a) We already have $\hat{c}$'s double-CRT representation.
   (b) Computing $\delta$'s double-CRT representation requires t "small FFT" modulo the $p_j$'s.

9 Other Optimizations

Some other optimizations that we encountered during our implementation work are discussed next. Not all of these optimizations are useful for our current implementation, but they may be useful in other contexts.

Three-Way Multiplications

Sometime we need to multiply several ciphertexts together, and if their number is not a power of two then we do not have a complete binary tree of multiplications, which means that at some point in the process we will have three ciphertexts that we need to multiply together.

The standard way of implementing this 3-way multiplication is via two 2-argument multiplications, e.g., $x \cdot (y \cdot z)$. But it turns out that here it is better to use "raw multiplication" to multiply these three ciphertexts (as done in [7]), thus getting an "extended" ciphertext with four elements, then apply key-switching (and later modulus switching) to this ciphertext. This takes only six ring-multiplication operations (as opposed to eight according to the standard approach), three modulus switching (as opposed to four), and only one key switching (applied to this 4-element ciphertext) rather than two (which are applied to 3-element extended ciphertexts). All in all, this three-way multiplication takes roughly 1.5 times a standard two-element multiplication.

We stress that this technique is not useful for larger products, since for more than three multiplicands the noise begins to grow too large. But with only three multiplicands we get noise of roughly $B^3$ after the multiplication, which can be reduced to noise$\approx$B by dropping two levels, and this is also what we get by using two standard two-element multiplications.

Commuting Automorphisms and Multiplications.

Recalling that the automorphisms $X \to X^i$ commute with the arithmetic operations, we note that some ordering of these operations can sometimes be better than others. For example, it may be better perform the multiplication-by-constant before the automorphism operation whenever possible. The reason is that if we perform the multiply-by-constant after the key-switching that follows the automorphism, then added noise term due to that key-switching is multiplied by the same constant, thereby making the noise slightly larger. We note that to move the multiplication-by-constant before the automorphism, we need to multiply by a different constant.

Switching to Higher-Level Moduli.

We note that it may be better to perform automorphisms at a higher level, in order to make the added noise term due to key-switching small with respect to the modulus. On the other hand operations at high levels are more expensive than the same operations at a lower level A good rule of thumb is to perform the automorphism operations one level above the lowest one. Namely, if the naive strategy that never switches to higher-level moduli would perform some Frobenius operation at level $q_i$, then we perform the key-switching following this Frobenius operation at level $Q_{i+1}$, and then switch back to level $q_{i+1}$ (rather than using $Q_i$ and $q_i$).

Commuting Addition and Modulus-Switching.

When we need to add many terms that were obtained from earlier operations (and their subsequent key-switching), it may be better to first add all of these terms relative to the large modulus $Q_i$ before switching the sum down to the smaller $q_i$ (as opposed to switching all the terms individually to $q_i$ and then adding).

Reducing the Number of Key-Switching Matrices.

When using many different automorphisms $\kappa_i: X \mapsto X^i$ we need to keep many different key-switching matrices in the public key, one for every value of i that we use. We can reduces this memory requirement, at the expense of taking longer to perform the automorphisms. We use the fact that the Galois group $\mathcal{G}$ al that contains all the maps $\kappa_i$ (which is isomorphic to $(\mathbb{Z}/m\mathbb{Z})^*$) is generated by a relatively small number of generators. (Specifically, for our choice of parameters the group $(\mathbb{Z}/m\mathbb{Z})^*$ has two or three generators.) It is therefore enough to store in the public key only the key-switching matrices corresponding to $\kappa_{g_j}$'s for these generators $g_j$ of the group $\mathcal{G}$ al. Then in order to apply a map $\kappa_i$ we express it as a product of the generators and apply these generators to get the effect of $\kappa_i$. (For example, if $i=g_1^2 \cdot g_2$ then we need to apply $\kappa_{g_1}$ twice followed by a single application of $\kappa_{g_2}$.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms that appear in the text or drawings are defined as follows.

AES Advanced Encryption Standard
BGV Brakerski, Gentry, and Vaikuntanathan
CRT Chinese Remainder Theorem
FFT Fast Fourier Transform
FHE Fully Homomorphic Encryption
GMP GNU Multiple Precision Arithmetic Library
HE Homomorphic Encryption
LWE Learning With Error
NTL Number Theory Library
SIMD Single Instruction, Multiple Data
whp with high probability

REFERENCES

[1] Benny Applebaum, David Cash, Chris Peikert, and Amit Sahai Fast cryptographic primitives and circular-secure encryption based on hard learning problems. In *CRYPTO*, volume 5677 of *Lecture Notes in Computer Science*, pages 595-618. Springer, 2009.

[2] Sanjeev Arora and Rong Ge. New algorithms for learning in the presence of errors. In *ICALP*, volume 6755 of *Lecture Notes in Computer Science*, pages 403-415. Springer, 2011.

[3] Joan Boyar and René Peralta. A depth-16 circuit for the AES S-box. Manuscript, eprint.iacr.org/2011/332, 2011.

[4] Zvika Brakerski. Fully homomorphic encryption without modulus switching from classical GapSVP. Manuscript, eprint.iacr.org/2012/078, 2012.

[5] Zvika Brakerski, Craig Gentry, and Vinod Vaikuntanathan. Fully homomorphic encryption without bootstrapping. In *Innovations in Theoretical Computer Science (ITCS'12)*, 2012. Available at eprint.iacr.org/2011/277.

[6] Zvika Brakerski and Vinod Vaikuntanathan. Efficient fully homomorphic encryption from (standard) LWE. In *FOCS'11*. IEEE Computer Society, 2011.

[7] Zvika Brakerski and Vinod Vaikuntanathan. Fully homomorphic encryption from ring-LWE and security for key dependent messages. In *Advances in Cryptology—CRYPTO 2011*, volume 6841 of *Lecture Notes in Computer Science*, pages 505-524. Springer, 2011.

[8] Jean-Sébastien Coron, Avradip Mandal, David Naccache, and Mehdi Tibouchi. Fully homomorphic encryption over the integers with shorter public keys. In *Advances in Cryptology—CRYPTO 2011*, volume 6841 of *Lecture Notes in Computer Science*, pages 487-504. Springer, 2011.

[9] Jean-Sébastien Coron, David Naccache, and Mehdi Tibouchi. Public key compression and modulus switching for fully homomorphic encryption over the integers. In *Advances in Cryptology—EUROCRYPT 2012*, volume 7237 of *Lecture Notes in Computer Science*, pages 446-464. Springer, 2012.

[10] Ivan Damgård and Marcel Keller. Secure multiparty aes. In *Proc. of Financial Cryptography 2010*, volume 6052 of *LNCS*, pages 367-374, 2010.

[11] Ivan Damgård, Valerio Pastro, Nigel P. Smart, and Sarah Zakarias. Multiparty computation from somewhat homomorphic encryption. Manuscript, 2011.

[12] Nicolas Gama and Phong Q. Nguyen. Predicting lattice reduction. In *EUROCRYPT*, volume 4965 of *Lecture Notes in Computer Science*, pages 31-51. Springer, 2008.

[13] Craig Gentry. Fully homomorphic encryption using ideal lattices. In Michael Mitzenmacher, editor, *STOC*, pages 169-178. ACM, 2009.

[14] Craig Gentry and Shai Halevi. Implementing gentry's fully-homomorphic encryption scheme. In *EUROCRYPT* volume 6632 of *Lecture Notes in, Computer Science*, pages 129-148. Springer, 2011.

[15] Craig Gentry, Shai Halevi, and Nigel Smart. Fully homomorphic encryption with polylog overhead. In *EUROCRYPT*, volume 7237 of *Lecture Notes in Computer Science*, pages 465-482. Springer, 2012. Full version at eprint.iacr.org/2011/566.

[16] Shafi Goldwasser, Yael Tauman Kalai, Chris Peikert, and Vinod Vaiknntanathan. Robustness of the learning with errors assumption. In *Innovations in Computer Science—ICS '10*, pages 230-240. Tsinghua University Press, 2010.

[17] Yan Huang, David Evans, Jonathan Katz, and Lior Malka. Faster secure two-party computation using garbled circuits. In *USENIX Security Symposium*, 2011.

[18] C. Orlandi J. B. Nielsen, P. S. Nordholt and S. Sheshank. A new approach to practical active-secure two-party computation. Manuscript, 2011.

[19] Kristin Lauter, Michael Naehrig, and Vinod Vaikuntanathan. Can homomorphic encryption be practical? In *CCSW*, pages 113-124. ACM, 2011.

[20] Richard Lindner and Chris Peikert. Better key sizes (and attacks) for lwe-based encryption. In *CT-RSA*, volume 6558 of *Lecture Notes in Computer Science*, pages 319-339. Springer, 2011.

[21] Adriana López-Alt, Eran Tromer, and Vinod Vaikuntanathan. On-the-fly multiparty computation on the cloud via multikey fully homomorphic encryption. In *STOC*. ACM, 2012.

[22] Vadim Lyubashevsky, Chris Peikert, and Oded Regev. On ideal lattices and learning with errors over rings. In *EUROCRYPT*, volume 6110 of *Lecture Notes in Computer Science*, pages 1-23, 2010.

[23] Daniele Micciancio and Oded Regev. *Lattice-based cryptography*, pages 147-192. Springer, 2009.

[24] Benny Pinkas, Thomas Schneider, Nigel P. Smart, and Steven C. Williams. Secure two-party computation is practical. In *Proc. ASIACRYPT 2009*, volume 5912 of *LNCS*, pages 250-267, 2009.

[25] Matthieu Rivain and Emmanuel Prouff Provably secure higher-order masking of AES. In *CHES*, volume 6225 of *Lecture Notes in Computer Science*, pages 413-427. Springer, 2010.

[26] Nigel P. Smart and Frederik Vercauteren. Fully homomorphic encryption with relatively small key and ciphertext sizes. In *Public Key Cryptography—PKC'10*, volume 6056 of *Lecture Notes in Computer Science*, pages 420-443. Springer, 2010.

[27] Nigel P. Smart and Frederik Vercauteren. Fully homomorphic SIMD operations. Manuscript at eprint.iacr.org/2011/133, 2011.

What is claimed is:

1. A method, comprising:
performing, by a computing device, homomorphic evaluation of a function on one or more input ciphertexts, where the one or more input ciphertexts were encrypted using a public key of an encryption scheme that also comprises a plurality of secret keys, where each input ciphertext comprises a plurality of real numbers that are kept with finite precision, and where performing the homomorphic evaluation of the function comprises performing one or more operations, and where performing each of one or more operations comprises:
  performing a key-switching transformation on selected ones of the one or more input ciphertexts, where performing key-switching transformation on a selected ciphertext comprises converting a first version of the selected ciphertext with respect to a first of the plurality of secret keys and with some number r bits of precision to a second version of the selected ciphertext with respect to a second of the plurality of secret keys and with some other number r' bits of precision, where r'>r,
  where each of the key switching transformations is performed prior to or after the one or more operations are evaluated; and
  outputting one or more results of the one or more operations.

2. The method of claim 1, where r'>2r.

3. The method of claim 1, where performing the homomorphic evaluation further comprises, prior to performing the key switching transformation, decreasing a norm of the first version of the selected ciphertext, by representing every number in the selected ciphertext via a sum number d>1 of smaller digits, and where r'>r+r/d.

4. The method of claim 1, where performing the homomorphic evaluation of the function further comprises performing the homomorphic evaluation of the function in order to evaluate a circuit comprising a plurality of levels.

5. The method of claim 4, where performing homomorphic evaluation of a function further comprises performing homomorphic evaluation of multiple functions in order to evaluate the circuit.

6. A computer system, comprising:
one or more memories comprising computer-readable program code; and
one or more processors,
wherein the one or more processors are configured, responsive to execution of the computer-readable program code, to cause the computer system to perform:
performing homomorphic evaluation of a function on one or more input ciphertexts, where the one or more input ciphertexts were encrypted using a public key of an encryption scheme that also comprises a plurality of secret keys, where each input ciphertext comprises a plurality of real numbers that are kept with finite precision, and where performing the homomorphic evaluation of the function comprises performing one or more operations, and where performing each of one or more operations comprises:
  performing a key-switching transformation on selected ones of the one or more input ciphertexts, where performing key-switching transformation on a selected ciphertext comprises converting a first version of the selected ciphertext with respect to a first of the plurality of secret keys and with some number r bits of precision to a second version of the selected ciphertext with respect to a second of the plurality of secret keys and with some other number r' bits of precision, where r'>r,
  where each of the key switching transformations is performed prior to or after the one or more operations are evaluated; and
  outputting one or more results of the one or more operations.

7. The computer system of claim 6, where r'>2r.

8. The computer system of claim 6, where performing the homomorphic evaluation further comprises, prior to performing the key switching transformation, decreasing a norm of the first version of the selected ciphertext, by representing every number in the selected ciphertext via a sum number d>1 of smaller digits, and where r'>r+r/d.

9. The computer system of claim 6, where performing the homomorphic evaluation of the function further comprises performing the homomorphic evaluation of the function in order to evaluate a circuit comprising a plurality of levels.

10. The computer system of claim 9, where performing homomorphic evaluation of a function further comprises performing homomorphic evaluation of multiple functions in order to evaluate the circuit.

11. A computer program product comprising a non-transitory computer readable storage medium having program code embodied therewith, the program code readable and executable by a computer to cause the computer to perform:
performing homomorphic evaluation of a function on one or more input ciphertexts, where the one or more input ciphertexts were encrypted using a public key of an encryption scheme that also comprises a plurality of secret keys, where each input ciphertext comprises a plurality of real numbers that are kept with finite precision, and where performing the homomorphic evaluation of the function comprises performing one or more operations, and where performing each of one or more operations comprises:
  performing a key-switching transformation on selected ones of the one or more input ciphertexts, where performing key-switching transformation on a selected ciphertext comprises converting a first version of the selected ciphertext with respect to a first of the plurality of secret keys and with some number r bits of precision to a second version of the selected ciphertext with respect to a second of the plurality of secret keys and with some other number r' bits of precision, where r'>r,
  where each of the key switching transformations is performed prior to or after the one or more operations are evaluated; and
  outputting one or more results of the one or more operations.

12. The computer program product of claim 11, where r'>2r.

13. The computer program product of claim 11, where performing the homomorphic evaluation further comprises, prior to performing the key switching transformation, decreasing a norm of the first version of the selected ciphertext, by representing every number in the selected ciphertext via a sum number d>1 of smaller digits, and where r'>r+r/d.

14. The computer program product of claim 11, where performing the homomorphic evaluation of the function further comprises performing the homomorphic evaluation of the function in order to evaluate a circuit comprising a plurality of levels.

15. The computer program product of claim 14, where performing homomorphic evaluation of a function further comprises performing homomorphic evaluation of multiple functions in order to evaluate the circuit.

16. The method of claim 1, wherein:
the method further comprises receiving at the computing device a query from a requestor computer system;
the performing the homomorphic evaluation of the function is performed one or more times to evaluate a circuit using the query, the query corresponds to the input ciphertexts, and evaluation of the circuit produces one or more results; and
the method further comprises sending the one or more results of the evaluation of the circuit to the requestor computer system.

17. The method of claim 16, wherein:
the computing device comprises a server residing on the Internet;
the server comprises one or more communications components; and
the method further comprises communicating by the server with the requestor computer system over the Internet using the one or wore communications components.

18. The computer system of claim 6, wherein:
the one or more processors are further configured, responsive to execution of the computer-readable program code, to cause the computer system to perform:
receiving at the computer system a query from a requestor computer system;
the performing the homomorphic evaluation of the function is performed one or more times to evaluate a circuit using the query, the query corresponds to the input ciphertexts, and evaluation of the circuit produces one or more results; and
the one or more processors are further configured, responsive to execution of the computer-readable program code, to cause the computer system to perform:
sending the one or more results of the evaluation of the circuit to the requestor computer system.

19. The computer system of claim 18, wherein:
the computer system resides on the Internet;
the computer system comprises one or more communications components; and
the one or more processors are ifirther configured, responsive to execution of the computer-readable program code, to cause the computer system to perform:
communicating by the computer system with the requestor computer system over the Tnternet using the one or more communications components.

20. The computer program product of claim 11, wherein:
the program code is readable and executable by a computer to cause the computer to perform: receiving at the computing device a query from a requestor computer system;
the performing the homomorphic evaluation of the function is performed one or more times to evaluate a circuit using the query, the query corresponds to the input ciphertexts, and evaluation of the circuit produces one or more results; and
the program code is readable and executable by a computer to cause the computer to perform: sending the one or more results of the evaluation of the circuit to the requestor computer system.

\* \* \* \* \*